United States Patent [19]
Yorita et al.

[11] Patent Number: 5,772,900
[45] Date of Patent: Jun. 30, 1998

[54] METHOD AND APPARATUS FOR RECLAIMING USED WORKING FLUID

[75] Inventors: Hiroshi Yorita, Toyoake; Takashi Yoshikawa, Nagoya, both of Japan

[73] Assignee: Noritake Co., Limited, Nagoya, Japan

[21] Appl. No.: 600,954

[22] PCT Filed: Jun. 20, 1995

[86] PCT No.: PCT/JP95/01239

§ 371 Date: Mar. 15, 1996

§ 102(e) Date: Mar. 15, 1996

[87] PCT Pub. No.: WO95/35261

PCT Pub. Date: Dec. 28, 1995

[30] Foreign Application Priority Data

Jun. 22, 1994 [JP] Japan .................................. 6-140009
Jan. 27, 1995 [JP] Japan .................................. 7-011762

[51] Int. Cl.$^6$ .................................................. B01D 17/12
[52] U.S. Cl. .................... 210/805; 210/168; 210/171; 210/87; 210/96.1; 210/101; 210/143; 210/195.1; 210/252; 210/257.1; 210/418; 451/88
[58] Field of Search .................................. 210/767, 650, 210/167, 168, 171, 805, 87, 96.1, 101, 143, 195.1, 252, 257.1, 418; 451/88

[56] References Cited

FOREIGN PATENT DOCUMENTS 56-152781  11/1981  Japan .
60-1403  1/1985  Japan .
4-315576  11/1992  Japan .

*Primary Examiner*—Robert Popovics
*Attorney, Agent, or Firm*—Oliff & Berridge P.L.C.

[57] ABSTRACT

A working fluid containing dispersed abrasive grains is used in abrasive machining, and a used working fluid contaminated with cutting chips or swarf produced during the abrasive machining is processed by first filter device, so that the abrasive grains in the used working fluid is recovered in the form of a suspension to provide a reclaimed working fluid in which the amount of the cutting chips is reduced. The used working fluid is reclaimed by the device, and the useful abrasive grains included in the used working fluid can be efficiently utilized without being discarded, whereby the abrasive grains in the working fluid is effectively utilized and the working cost is reduced. The device employs a so-called cross flow filtration system, wherein filtration films have mesh openings which are sufficiently smaller than an average grain size of the abrasive grains. Accordingly, when the used working fluid flows through a circulating path in the device, only the cutting chips are passed through the mesh openings together with a portion of a medium liquid while the abrasive grains are circulated in the circulating path with the rest of the liquid without deposition on the films.

19 Claims, 10 Drawing Sheets

METHOD AND APPARATUS FOR RECLAIMING USED WORKING FLUID

BACKGROUND OF THE INVENTION

1. Field of the Art

The present invention relates to a method and an apparatus for reclaiming a used working fluid produced after the working fluid which contains abrasive grains dispersed in a medium liquid is used in abrasive machining on a workpiece.

2. Discussion of the Prior Art

In various kinds of working operation on a workpiece such as a grinding operation on a silicon wafer or a cutting operation using a wire saw, an oily or aqueous working fluid is used, which is prepared by dispersing abrasive grains such as GC or WA in a medium liquid such as kerosene or water. In abrasive machining using the thus prepared working fluid, a workpiece is processed while the working fluid is applied to the surface of the workpiece. The working fluid which has been applied to the workpiece is recovered and applied again to the workpiece. Thus, the working fluid is circulated and repeatedly used in the abrasive machining. The working fluid is applied to the workpiece so that the abrasive grains in the working fluid are supplied to the surface of the workpiece for assuring an intended machining operation. In addition, the working fluid functions to wash away cutting chips or swarf produced during the machining operation on the workpiece.

In the abrasive machining as described above, since the working fluid is circulated and repeatedly used, the working fluid is inevitably contaminated with the cutting chips. As the working operation proceeds, the concentration of the cutting chips in the working fluid is gradually increased. When the concentration of the cutting chips exceeds a certain threshold (about 0.5 kg/l, for instance, where the working fluid containing GC abrasive grains of #1000 size and having a concentration of 1.6 kg/l is used for lapping operation on a silicon wafer) determined depending upon the working conditions and other factors, the working accuracy is deteriorated since the temperature of the working fluid is raised due to an increase in the friction. Further, the cutting chips included in the working fluid hinder contact of the abrasive grains in the working fluid with the workpiece, undesirably lowering the working efficiency. In view of this, the concentration of the cutting chips in the working fluid should be maintained lower than the above-described threshold. Therefore, the working fluid whose cutting chip concentration exceeds the threshold is reclaimed by removing the cutting chips from the used working fluid, or the used working fluid is replaced with a fresh working fluid which does not contain the cutting chips.

The cutting chips produced during the working operation are extremely small generally having an average grain size which is not larger than about one tenth of that of the abrasive grains. Thus, it is difficult to remove the cutting chips from the used working fluid. When the cutting chips are removed by a membrane filtration method using a membrane filter having pores which are sufficiently smaller than the average grain size of the abrasive grains, the cutting chips can be separated from the medium liquid containing the abrasive grains. In this method, however, the abrasive grains are deposited on the surface of the membrane filter and form a cake layer thereon. This cake layer prevents the cutting chips from being passed through the membrane filter and only the medium liquid is transmitted therethrough. In this case, the membrane filter needs to be frequently replaced with new ones for attaining a sufficient removal of the cutting chips. Further, when the cake of the abrasive grains is reduced, it is difficult to disperse the abrasive grains of the cake in the medium liquid. The cutting chips of silicon, for instance, have a smaller specific gravity and a smaller grain size than the abrasive grains such as GC grains. Accordingly, it is possible to remove the cutting chips from the working fluid by precipitating the abrasive grains, and throwing away a supernatant liquid and thereby separating the cutting chips. In this case, too, it is extremely difficult to disperse the precipitated abrasive grains in the medium liquid, since the precipitated abrasive grains form an aggregate.

Conventionally, when the cutting chip concentration in the working fluid exceeds the predetermined threshold, the used working fluid which contains the abrasive grains and the cutting chips is discarded by an amount equal to about one third of the total amount of the working fluid, and a fresh working fluid which contains the abrasive grains and which does not contain the cutting chips is added to the used working fluid, so that the cutting chip concentration in the working fluid is lowered. After the partial discarding of the used working fluid and the addition of the fresh working fluid as described above are repeated several times, the total amount of the working fluid is discarded and replaced by the fresh working fluid. Thus, the cutting chip concentration in the working fluid is maintained lower than the above-described threshold. In this method, however, when the used working fluid is discarded, the still useful and expensive abrasive grains are also discarded in a large quantity, leading to an increase in the working cost. In addition, the disposal of the used working fluid which includes the abrasive grains and cutting chips undesirably causes a problem of environmental pollution.

In the light of these problems, laid-open Publication No. 4-315576 of unexamined Japanese Patent Application, for example, discloses a technique of using a working fluid reclaiming apparatus having liquid cyclones, wherein the working fluid which has been used in a lapping device is classified in each liquid cyclone, into fine particles of the cutting chips and coarse particles of the abrasive grains. According to the disclosed apparatus, the coarse particles of abrasive grains drop downward along a conical inner surface of the liquid cyclone due to a centrifugal force, and are consequently recovered in the form of a suspension from the lower end of the liquid cyclone. On the other hand, the fine particles of cutting chips are spiralled upward in a diametrically central portion of the liquid cyclone and are recovered in the form of a suspension from the upper end of the liquid cyclone. Thus, the cutting chips are removed from the used working fluid, and at the same time, the abrasive grains are recovered as a suspension, whereby the used working fluid is reclaimed.

It is noted that the working efficiency in various working operations such as lapping is increased with an increase in the abrasive grain concentration in the working fluid. In recent working operations, the working fluid having a considerably high abrasive grain concentration is used as described above. In the lapping operation, the working fluid having a comparatively high viscosity, e.g., 50–100 cp, is preferably used. The technique disclosed in the above publication, however, is not capable of providing a satisfactory classifying effect by the centrifugal force when the working fluid has a relatively high abrasive grain concentration or a relatively high viscosity. Accordingly, if the used working fluid having a high abrasive grain concentration (e.g., the abrasive grain concentration is higher than 50 wt %, in other words, 0.5 kg/l) or having a high viscosity is processed by the disclosed reclaiming apparatus, the working fluid is recovered from each of the lower and upper ends of the liquid cyclone, respectively, substantial classification of the cutting chips and abrasive grains. This limitation in permissible ranges of the abrasive grain concentration and the viscosity of the working fluid in the disclosed reclaiming apparatus makes it impossible to reclaim the used working fluid having a high abrasive grain concentration and a high viscosity suitable for the lapping operation. Even if the abrasive grain concentration and viscosity are within the permissible ranges, the classifying performance of the liquid cyclone varies with a variation in the abrasive grain concentration. Accordingly, in the disclosed apparatus, it is required to control the abrasive grain concentration of the used working fluid so as to attain a constant rate of recovery of the abrasive grains and a constant rate of removal of the cutting chips.

In the reclaiming apparatus as described above, the accuracy in classifying the used working fluid by the liquid cyclone is relatively low, and therefore a plurality of liquid cyclones are disposed as shown in FIG. 1 of the above-indicated publication so as to obtain a high recovery rate of the abrasive grains. This arrangement inevitably makes the apparatus complicated and increases the operating cost of the device. The above-disclosed reclaiming apparatus must be assigned to deal with the used working fluid having a low concentration, in view of the above-mentioned permissible range in the abrasive grain concentration of the working fluid. This means that the reclaiming capability exhibited by the disclosed reclaiming apparatus is comparatively low. Thus, the used working fluid must be repeatedly treated with the reclaiming apparatus throughout the lapping or other working operation, where a large amount of the cutting chips should be removed from the used working fluid. In this case, the reclaiming device needs to be built in the lapping or other working device.

The present invention was developed in the light of the above-described situations. It is therefore an object of the present invention to provide a method and an apparatus for reclaiming a used working fluid, which are relatively simple in arrangement and which make it possible to reclaim a used working fluid having a relatively high abrasive grain concentration and a high viscosity suitable for abrasive machining with improved working efficiency.

SUMMARY OF THE INVENTION

The above object may be attained according to a first aspect of the invention which provides a method of reclaiming a used working fluid produced after a working fluid which contains abrasive grains dispersed therein is used for abrasive machining on a workpiece, wherein cutting chips produced during the abrasive machining are removed from the used working fluid, the method being characterized by comprising the steps of: (a) circulating the used working fluid in a circulating path including a cross flow filter having a first chamber and a second chamber which are defined by a cross flow filtration film, the cross flow filtration film having pores which are sufficiently smaller than an average grain size of the abrasive grains and are sufficiently larger than an average grain size of the cutting chips; (b) cross flow filtering the used working fluid while the used working fluid is fed to flow over the surface of the cross flow filtration film, such that a portion of the used working fluid is discharged through the cross flow filtration film, as a waste fluid, into the second chamber of the cross flow filter together with the cutting chips, for reducing an amount of the cutting chips in the used working fluid flowing in the circulating path, and; (c) recovering a reclaimed working fluid from the circulating path, the reclaimed working fluid containing the the cutting chips in an amount which has been reduced in the step of cross flow filtering the used working fluid.

According to the reclaiming method as described above, the used working fluid is subject to a so-called cross flow filtration utilizing the cross flow filtration film which inhibits the transmission therethrough of the abrasive grains and which permits the transmission therethrough of the cutting chips. While the used working fluid is flowing in the circulating path in the circulating step, a portion of the fluid is discharged, as a waste fluid, into the second chamber of the cross flow filter together with the cutting chips in the cross flow filtering step. Accordingly, in the used working fluid flowing in the circulating path, the amount of the cutting chips is reduced depending on the amount of the waste fluid which has been discharged into the second chamber while the amount of the abrasive grains is kept at an initial value, so that the abrasive grains are recovered in the form of a suspension in the reclaimed working fluid recovering step. In the reclaimed working fluid, the ratio of the amount of the cutting chips to the amount of the abrasive grains is made smaller, so that the reclaimed working fluid can be reused in the abrasive machining.

In the cross flow filtering step wherein the used working fluid is fed to flow over the surface of the cross flow filtration film, the abrasive grains are maintained in the form of the suspension in the circulating fluid without being deposited on the surface of the filtration film. In this respect, the used working fluid having a high abrasive grain concentration and a high viscosity can be suitably processed according to the present reclaiming method. In contrast with the conventional reclaiming apparatus employing liquid cyclones, the present arrangement is free from the limitation in the concentration and viscosity of the used working fluid to be reclaimed. Further, the present reclaiming method can be practiced by a comparatively simple arrangement which is constituted by the cross flow filter, circulating path and recovering device.

The cross flow filtration, in general, is adapted to obtain a filtrate by removing suspended particles from a suspension. The working fluid which has been used in an abrasive machining operation contains the abrasive grains having a relatively large grain size and cutting chips having a grain size which is about 1/10 of the abrasive grains. These cutting chips are uniformly dispersed in the used working fluid. Accordingly, if the used working fluid is cross-flow filtered through the filtration film as described above, the used working fluid in the circulating path has the same cutting chip concentration as the working fluid which has been passed through the filtration film. Namely, in the used working fluid flowing in the circulating path, the amount of the abrasive grains is kept constant while the amount of the cutting chips is reduced in proportion with the amount of the waste fluid discharged into the second chambers. For instance, if the used working fluid is discharged into the second chamber of the cross flow filter by an amount equal to ¾ of the total amount of the used working fluid, the cutting chips included in the circulating used working fluid is reduced to ¼ of the amount of the cutting chips initially included in the used working fluid.

The present invention was developed in light of the above. The filtering operation is terminated when the ratio of the cutting chip concentration to the abrasive grain concentration in the used working fluid becomes equal to a predetermined value, thereby to recover the reclaimed working fluid from the circulating path. In the reclaimed working fluid recovered as described above, the amount of the cutting chips is reduced while the abrasive grains are dispersed therein. According to the present reclaiming method, a portion of the used working fluid is discharged while the cutting chip concentration is kept constant. Thus, the classification performance (the abrasive grain recovery rate and the cutting chip removal rate) of the present reclaiming method is not influenced by the abrasive grain concentration in the used working fluid.

The average grain size of the cutting chips produced by abrasive machining is generally 1/5~1/20 of the average grain size of the abrasive grains. In view of this, the pore size of the cross flow filtration film is determined to be about 1/5~3/4, more preferably, 1/2 of the average grain size of the abrasive grains, whereby only the cutting chips are passed through the filtration film and removed from the used working fluid. If the pore size of the filtration film is made relatively large, those abrasive grains whose size has been reduced due to crushing or wearing in the abrasive machining are also removed from the used working fluid, providing the reclaimed working fluid which is further suitable for the abrasive machining.

The reclaimed working fluid recovered according to the present method has a high abrasive grain concentration since a portion of the used working fluid is discharged into the second chamber of the cross flow filter together with the cutting chips. It is therefore required to add the medium liquid which does not contain the abrasive grains, to the used working fluid or to the reclaimed working fluid before, during or after the filtering operation, in order to attain the nominal abrasive grain concentration.

Preferably, the method of reclaiming the used working fluid according to the first aspect of the invention further comprises a step of adding a medium liquid which does not contain the abrasive grains and the cutting chips, to the used working fluid before or while the used working fluid is flowing in the circulating path. In this case, the medium liquid is added by an amount equal to an amount of the waste fluid which has been discharged into the second chamber in the step of cross flow filtering the used working fluid. According to this arrangement, the abrasive grain concentration of the used working fluid in the circulating path is not raised, assuring an improved filtering efficiency and reducing the load of a pump for circulation of the used working fluid. In this arrangement, the filtering operation is terminated when the amount of the medium liquid added to the used working fluid has become equal to the amount of the waste fluid which has been discharged into the second chamber, so as to recover the reclaimed working fluid from the circulating path. In this reclaimed working fluid, the amount of the cutting chips is reduced depending on the ratio of the amount of the added medium liquid to the initial amount of the used working fluid in the circulating path. On the other hand, the abrasive grain concentration in the reclaimed working fluid is kept equal to that of the used working fluid before the medium liquid is added thereto. Thus, it is not required to adjust the abrasive grain concentration of the reclaimed working fluid before it is utilized in the abrasive machining.

The above object may be attained according to a second aspect of the invention which provides a method of reclaiming a used working fluid produced after a working fluid which contains abrasive grains dispersed therein is used for abrasive machining on a workpiece, wherein cutting chips produced during the abrasive machining are removed from the used working fluid, the method being characterized by comprising the steps of: (d) circulating the used working fluid in a circulating path including a cross flow filter having a first chamber and a second chamber which are defined by a cross flow filtration film, the cross flow filtration film having pores which are sufficiently smaller than an average grain size of the abrasive grains and are sufficiently larger than an average grain size of the cutting chips; (e) cross flow filtering the used working fluid while the used working fluid is fed to flow over the surface of the cross flow filtration film, such that a portion of the used working fluid is discharged through the cross flow filtration film, as a waste fluid, into the second chamber of the cross flow filter together with the cutting chips, for reducing an amount of the cutting chips in the used working fluid flowing in the circulating path; (f) supplying a medium liquid which does not contain the abrasive grains and the cutting chips, to the circulating path, such that at least a portion of the medium liquid is fed to the first chamber via the second chamber of the cross flow filter, the medium liquid being supplied to the circulating path by an amount equal to an amount of the waste fluid which has been discharged into the second chamber in the step of cross flow filtering the used working fluid; and (g) recovering a reclaimed working fluid from the circulating path, the reclaimed working fluid including the medium liquid in an amount equal to that of the medium liquid initially included in the used working fluid.

According to the reclaiming method as described above, the used working fluid is subject to a so-called cross flow filtration utilizing the cross flow filtration film which inhibits the transmission therethrough of the abrasive grains and which permits the transmission therethrough of the cutting chips. While the used working fluid is flowing in the circulating path in the circulating step, a portion of the fluid is discharged, as a waste fluid, into the second chamber of the cross flow filter together with the cutting chips in the cross flow filtering step. In the medium liquid supplying step, the medium liquid which does not contain the abrasive grains and the cutting chips is added to the used working fluid in the circulating path by an amount equal to the amount of the waste fluid which has been discharged into the second chamber, so that the amount of the medium liquid in the circulating fluid is kept at the initial level, and the abrasive grains in the circulating fluid are recovered in the form of a suspension in the recovering step. Accordingly, in the reclaimed working fluid recovered according to the present method, the amount of the cutting chips is reduced depending upon the amount of the waste fluid which has been discharged into the second chamber, while the amounts of the abrasive grains and the medium liquid are kept at the respective initial levels. In the reclaimed working fluid, the ratio of the amount of the cutting chips to the amount of the abrasive grains is made smaller while the abrasive grain concentration is kept constant, so that it is not necessary to adjust the abrasive grain concentration in the reclaimed working fluid before it is utilized in the abrasive machining.

As in the above method according to the first aspect of the invention, the cutting chips are removed from the used working fluid by effecting the cross flow filtration. According to this method, it is possible to process the used working fluid having a high abrasive grain concentration and a high viscosity suitable for improved working efficiency of the abrasive machining. Further, the reclaiming method according to the second aspect of the invention can be practiced by a comparatively simple arrangement which is constituted by the cross flow filter, circulating path, medium liquid supply device and recovering device.

In the cross flow filtration, in general, a so-called back-washing of the cross flow filtration film needs to be effected, wherein the medium liquid which does not contain the abrasive grains and the cutting chips is transmitted through the filtration film from the second chamber to the first chamber of the cross flow filter for the purpose of assuring a sufficient filtration flux and effective transmission of the cutting chips through the filtration film, by eliminating clogging of the filtration film. In the present invention, the backwashing of the filtration film is effected while a portion of the medium liquid is supplied to the circulating path via the second chamber of the cross flow filter in the medium liquid supply step.

Described more specifically, the abrasive grain concentration of the used working fluid flowing in the circulating path is raised since the medium liquid is discharged into the second chamber together with the cutting chips in the cross flow filtering step. Accordingly, it is necessary to add the medium liquid which does not contain the abrasive grains and the cutting chips, to the used working fluid in the circulating path so that the reclaimed working fluid recovered from the circulating path has the abrasive grain concentration suitable for the abrasive machining. According to the present reclaiming method, at least a portion of the medium liquid is supplied to the circulating path in the medium liquid supplying step such that the medium liquid is fed from the second chamber to the first chamber through the cross flow filtration film. In the present arrangement, therefore, the backwashing of the cross flow filtration films is effected, while at the same time, the abrasive concentration in the reclaimed working fluid is adjusted to the predetermined desired value.

In the present apparatus according to the second aspect of the invention, the reclaimed working fluid is recovered from the circulating path and it does not matter to return the medium liquid without the abrasive grains and the cutting chips to the circulating path while effecting the backwashing. Accordingly, it is possible to frequently effect the backwashing of the filtration film (in the medium liquid supply step) for maintaining a high filtering flux. In the present arrangement, the amount of the medium liquid to be supplied to the circulating path for adjusting the abrasive grain concentration is equal to the amount of the waste fluid which has been transmitted into the second chamber in the cross flow filtering step. The medium liquid may be supplied to the circulating path such that the entire amount of the medium liquid is fed from the second chamber to the first chamber of the cross flow filter.

In the conventional cross flow filtration, the fluid transmitted into the second chamber is recovered, while on the other hand, the fluid remaining in the circulating path after the filtering operation is discarded as a waste fluid. In this case, if the transmitted fluid is returned to the circulating path for effecting the backwashing, it undesirably increases the amount of the transmitted fluid which is discarded as the waste fluid, lowering the reclaiming efficiency. In the conventional cross flow filtration, therefore, it is difficult to maintain a high filtering flux while frequently effecting the backwashing.

Next, there will be explained preferable forms of the reclaiming methods according to the first and second aspects of the invention. In the above-described methods, the cross flow filtration film of the cross flow filter is preferably formed of a single mesh layer. When the cross flow filtration film has a relatively large thickness, e.g., when the cross flow filter is a ceramic filter in which the filtration film is formed on the surface of a porous ceramic, the cutting chips are gradually deposited within the cross flow filtration film, preventing the transmission of the cutting chips through the filtration film. If the filtering operation is continued in this state for a long period, the cutting chips do not pass through the filtration film and only the medium liquid flows through the filtration film. In this case, the amount of the cutting chips in the used working fluid which flows in the circulating path is not sufficiently reduced. For permitting the transmission of the cutting chips through the filtration film, it is necessary to frequently replace the cross flow filtration film with a new one. According to the present form of the invention, the cutting chips do not tend to be deposited within the cross flow filtration firm and the cutting chips are passed through the filtration film together with the medium liquid, making it possible to continuously process the used working fluid without frequently replacing the filtration film.

The above reclaiming methods of the used working fluid according to the first and second aspects of the invention may further comprise a step of recovering the medium liquid which does not contain the abrasive grains and the cutting chips, by filtering the waste fluid which has been discharged into the second chamber of the cross flow filter together with the cutting chips, through another or second filtration film having pores which are sufficiently smaller than the average grain size of the cutting chips. According to this arrangement, the medium liquid which has been discharged into the second chamber together with the cutting chips is recovered, assuring effective utilization of the medium liquid and further reduction in the working cost while reducing the amount of the waste fluid to be discarded.

In the above step of recovering the medium liquid, the waste fluid which has been discharged from the cross flow filter is adapted to flow in a second circulating path which is defined by a first chamber of a filtering device which is separated from a second chamber by the filtration film. While the waste fluid is flowing in the second circulating path, the medium liquid is transmitted through the second filtration film and is recovered in the second chamber. As a result, the waste fluid flowing in the second circulating path is concentrated. This means that the waste fluid is cross-flow filtered in the above step of recovering the medium liquid, and accordingly, the filtration film does not suffer from clogging with the cutting chips, to thereby assure a satisfactory filtering efficiency. Moreover, if the waste fluid in the second circulating path is discarded after the cutting chip concentration of the waste fluid is raised to a sufficient extent, the medium liquid to be discarded with the concentrated waste fluid can be reduced.

The above method of reclaiming the used working fluid according to the first aspect of the invention may further comprises a step of recovering the medium liquid by filtering the waste fluid which has been discharged into the second chamber of the cross flow filter together with the cutting chips, through another filtration film having pores which are sufficiently smaller than the average grain size of the cutting chips. In this case, the recovered medium liquid is utilized in the step of adding the medium liquid. In this arrangement, the medium liquid can be efficiently used, assuring reduction in the working cost while reducing the amount of the medium liquid to be discarded together with the concentrated waste fluid.

The above method of reclaiming the used working fluid according to the second aspect of the invention preferably further comprises a step of recovering the medium liquid by filtering the waste fluid which has been discharged into the second chamber of the cross flow filter together with the cutting chips, through another or second filtration film having pores which are sufficiently smaller than the average grain size of the cutting chips. In this case, the recovered medium liquid is utilized in the step of supplying the medium liquid. In this arrangement, the medium liquid can be efficiently used, assuring reduction in the working cost while reducing the amount of the medium liquid to be discharged together with the concentrated waste fluid.

The above step of supplying the medium liquid according to the second aspect of the invention may be adapted to stop a circulating flow of the used working fluid in the circulating path after the second chamber of the cross flow filter is filled with the medium liquid.

According to this arrangement, the surface of the filtration film of the cross flow filter is kept under pressure of the used working fluid flowing in the circulating path before the second chamber of the cross flow filter is filled with the medium liquid. In this state, the medium liquid in the second chamber does not begin to flow into the first chamber through the filtration film. In other words, the backwashing of the filtration film is effected only after the second chamber is filled with the medium liquid. Accordingly, the entire surface of the filtration film can be backwashed with a high stability.

Described more specifically, when the backwashing of the filtration film is effected in the conventional cross flow filter, the medium liquid begins to be supplied to the second chamber after the circulating flow of the used working fluid is stopped (generally, after the circulating pump is turned off). Since it is required that the cross filtration film of the present invention have mesh openings which are comparatively large for permitting the cutting chips to pass through the mesh openings, the medium liquid supplied to the second chamber is immediately transmitted into the first chamber through the filtration film if the backwashing is effected in a way as effected in the usual cross flow filter as described above. In this case, since the medium liquid is transmitted to the first chamber before the second chamber is filled with the medium liquid, only the lower portion of the filtration film is exclusively backwashed by the transmitted medium liquid. Accordingly, even after the second chamber is filled with the medium liquid, the medium liquid tends to flow through the lower portion of the filtration film which has been backwashed by the medium liquid, due to a lower resistance of flow of the medium liquid. In this case, the upper portion of the filtration film may not be backwashed to a satisfactory extent. In contrast, in the present arrangement, the backwashing is effected only after the second chamber is filled with the medium liquid, whereby the cross flow filtration film can be backwashed substantially uniformly over the entire surfaces.

The object of the invention may be attained according to a third aspect of the invention which provides an apparatus for reclaiming a used working fluid produced after a working fluid which contains abrasive grains dispersed therein is used for abrasive machining on a workpiece, wherein cutting chips produced during the abrasive machining are remove from the used working fluid, the apparatus being characterized by comprising: (h) a first reservoir for storing the used working fluid; (i) a cross flow filter having a first chamber and a second chamber which are defined by a cross flow filtration film, the cross flow filtering film having pores which are sufficiently smaller than an average grain size of the abrasive grains and are sufficiently larger than an average grain size of the cutting chips; (j) a circulating path which is partially defined by the first reservoir and the cross flow filter; (k) a circulating device for circulating the used working fluid in the circulating path, while the used working fluid is fed to flow over the surface of the cross flow filtration film, so that a portion of the used working fluid is cross-flow filtered through the cross flow filtration film, and discharged with the cutting chips as a waste fluid, into the second chamber of the cross flow filter; and (l) a recovering device for recovering a reclaimed working fluid from the circulating path.

The reclaiming apparatus according to this third aspect of the invention employs a so-called cross flow filtration system in which the cross flow filter having the cross flow filtration film is provided in the circulating path. The cross flow filtration film inhibits the transmission therethrough of the abrasive grains and permits the transmission therethrough of the cutting chips. While the used working fluid flows in the circulating path by the circulating device, a portion of the fluid is discharged from the cross flow filter together with the cutting chips as the waste fluid. On the other hand, the fluid in the circulating path is recovered in the form of a suspension by the recovering device.

As in the first and second aspects of the invention, the amount of the abrasive grains in the reclaimed working fluid obtained by the present apparatus is kept constant throughout the reclaiming process, but the amount of the cutting chips is reduced depending on the amount of the waste fluid which has been discharged from the cross flow filter. Thus, the ratio of the amount of the cutting chips to the amount of the abrasive grains is reduced. The reclaimed working fluid can be utilized in the abrasive machining by adding, as needed, the medium liquid which does not contain the abrasive grains and the cutting chips. The recovering device according to this aspect of the invention is constituted by providing the circulating path with a recovery passage having a shut-off valve, for instance. In this case, the valve is opened to recover the reclaimed working fluid from the recovery passage.

The object of the present invention may be attained according to a fourth aspect of the invention which provides an apparatus which comprises the first reservoir, the cross flow filter, the circulating path, the circulating device, and the recovering device which are provided in the apparatus according to the third aspect of the invention, the apparatus further comprising a medium liquid supply device including: (m) a medium liquid reservoir for storing the medium liquid which does not contain the abrasive grains and the cutting chips; (n) a medium liquid supply passage which connects the medium liquid reservoir to the second chamber of the cross flow filter; and a fluid flow measuring device for measuring an amount of the waste fluid which has been discharged from the circulating path into the second chamber by the circulating device, and an amount of the medium liquid which has been supplied from the medium liquid reservoir to the circulating path, the medium liquid supply device supplying the medium liquid in the reservoir to the circulating path, such that at least a portion of the medium liquid is fed to the first chamber via the second chamber of the cross flow filter, the medium liquid being supplied to the circulating path by an amount equal to the amount of the waste fluid which has been discharged into the second chamber.

The reclaiming apparatus according to this fourth aspect of the invention further comprises the medium liquid supply device as described above. In this arrangement, the medium liquid in the reservoir is supplied to the circulating path by the supply device so that the cross flow filtration film is backwashed by the medium liquid, while at the same time, the amount of the medium liquid included in the used working fluid flowing in the circulating path is held at a substantially constant level throughout the reclaiming process.

As in the second aspect of the invention, the amounts of the medium liquid and the abrasive grains in the reclaimed working fluid recovered by the present apparatus are kept constant, while on the other hand, the amount of the cutting chips is reduced depending on the amount of the waste fluid which has been discharged from the cross flow filter. Accordingly, the ratio of the amount of the cutting chips to the amount of the abrasive grains is reduced while the abrasive grain concentration is maintained at the initial level. Thus, the reclaimed working fluid obtained by the present apparatus can be utilized in the abrasive machining without adjustment of the abrasive grain concentration. The recovering device according to this aspect of the invention is constituted by providing the circulating path with a recovery passage having a shut-off valve, for instance. In this case, the shut-off valve is opened to recover the reclaimed working fluid from the recovery passage.

There will be next described preferred forms of the third and the fourth aspects of the invention. In the reclaiming apparatus according to these aspects of the invention, the cross flow filtration film of the cross flow filter is preferably formed of a single mesh layer.

In the reclaiming apparatus according to the fourth aspect of the invention, the cross flow filter is preferably disposed such that the lower end of the second chamber is positioned above the lower end of the first chamber and the level of the used working fluid stored in the first reservoir. According to this arrangement, the medium liquid supplied by the supply device from the medium liquid reservoir to the circulating path via the second chamber of the cross flow filter is entirely returned to the circulating path which includes the cross flow filter and the first reservoir. When the used working fluid subsequently flows in the circulating path by the circulating device and a portion of the fluid is discharged, as the waste fluid, into the second chamber together with the cutting chips, the medium liquid which has been supplied from the reservoir is not left in the second chamber. Thus, the medium liquid supplied from the reservoir is not discharged together with the cutting chips. In the present reclaiming apparatus, the medium liquid supplied from the reservoir by the supply device is entirely fed into the circulating path so that the amount of the medium liquid in the circulating used working fluid is kept at a substantially constant level.

In a preferred form of the fourth aspect of the invention, the cross flow filter is disposed such that the upper end of the cross flow filter is positioned below the fluid level of the medium liquid stored in the medium liquid reservoir. According to this arrangement, the level of the medium liquid stored in the reservoir is higher than the upper end of the cross flow filter. Therefore, the medium liquid fed from the reservoir reaches to the uppermost portion of the cross flow filter due to a water head difference. Namely, it is not required to provide a feeding device such as a pump in the medium liquid supply passage when the cross flow filtration film is backwashed by the medium liquid which is fed from the reservoir. The filtration film can be easily backwashed over the entire surface thereof according to the present arrangement having a simple construction.

Preferably, the reclaiming apparatus according to the third aspect of the invention further comprises a medium liquid recovering device for recovering the medium liquid which does not contain the abrasive grains and the cutting chips, by filtering the waste fluid which has been discharged into the second chamber of the cross flow filter, through another filtration film having pores which are sufficiently smaller than the average grain size of the cutting chips.

Preferably, the reclaiming apparatus according to the fourth aspect of the invention further comprises a medium liquid recovering device for recovering the medium liquid which does not contain the abrasive grains and the cutting chips, by filtering the waste fluid which has been discharged into the second chamber of the cross flow filter, through another filtration film having pores which are sufficiently smaller than the average grain size of the cutting chips, the recovered medium liquid being supplied to the medium liquid reservoir. According to this arrangement, the medium liquid in the waste fluid which has been discharged into the second chambers of the cross flow filter is recovered by the recovering device, and is consequently supplied to the circulating path by the supply device. Therefore, the amount of the medium liquid to be discarded is reduced, to thereby reduce the working cost of the abrasive machining. Further, the amount of the concentrated waste fluid to be discarded is reduced, leading to reduced adverse influence on the environment.

Preferably, the medium liquid recovering device according to the third and fourth aspects of the invention further comprises: a second reservoir for storing the waste fluid which has been discharged into the second chamber of the cross flow filter; a filtering device having a first chamber and a second chamber which are defined by the filtration film; a second circulating path partially defined by the second reservoir and the first chamber of the filtering device; a circulating device for circulating the waste fluid in the second circulating path with the waste fluid being fed to flow over the surface of the filtration film, while the waste fluid is cross-flow filtered through the filtration film so that the medium liquid which does not contain the cutting chips is fed into the second chamber of the filtering device; and a discharging device for discharging a concentrated waste fluid having a cutting chip concentration which has been raised while the waste fluid is circulated in the second circulating path.

The medium liquid recovering device according to this aspect of the invention preferably employs the cross flow filtering system. The discharging device according to this aspect of the invention is preferably constituted by providing the second circulating path with a discharging line having a shut-off valve, for instance. In this case, the shut-off valve is opened for discharging the concentrated waste fluid from the discharging line.

Preferably the reclaiming apparatus according to the third aspect of the invention further comprises; a medium liquid reservoir for storing the medium liquid transmitted into the second chamber; a medium liquid supply passage having a fluid flow control valve and a feeding device, the supply passage connecting the medium liquid reservoir to the first reservoir; means for detecting a concentration of the abrasive grains in the used working fluid flowing in the circulating path; and a control device for controlling the concentration of the abrasive grains to be held within a predetermined range by opening and closing the fluid flow control valve, based on the detected concentration of the abrasive grains.

According to this arrangement, the medium liquid recovered by the medium liquid recovering device is supplied to the first reservoir depending on a change in the abrasive grain concentration of the used working fluid flowing in the circulating path, whereby the abrasive grain concentration is held within the predetermined range. The abrasive grain concentration of the used working fluid in the circulating path is raised since the used working fluid is discharged into the second chamber of the cross flow filter. However, in the present arrangement, the medium liquid is supplied to the circulating path such that the abrasive grain concentration of the used working fluid in the circulating path is held in the predetermined range which assures a sufficiently high filtering efficiency. Furthermore, in the reclaimed working fluid to be recovered by the present arrangement, the abrasive grain concentration is kept at the initial level. Thus, the reclaimed working fluid can be utilized in the abrasive machining without adjusting the abrasive grain concentration.

BRIEF DESCRIPTION OF THE DRAWINGS

The present invention will be better understood by reading the following detailed description of presently preferred embodiments of the invention, when considered in connection with the accompanying drawing in which.

DETAILED DESCRIPTION OF THE PREFERRED EMBODIMENT

There will be described one embodiment of the present invention by reference to the drawings. It is to be understood that various components in the following description are not necessarily illustrated in an exact scale.

Figure 1:
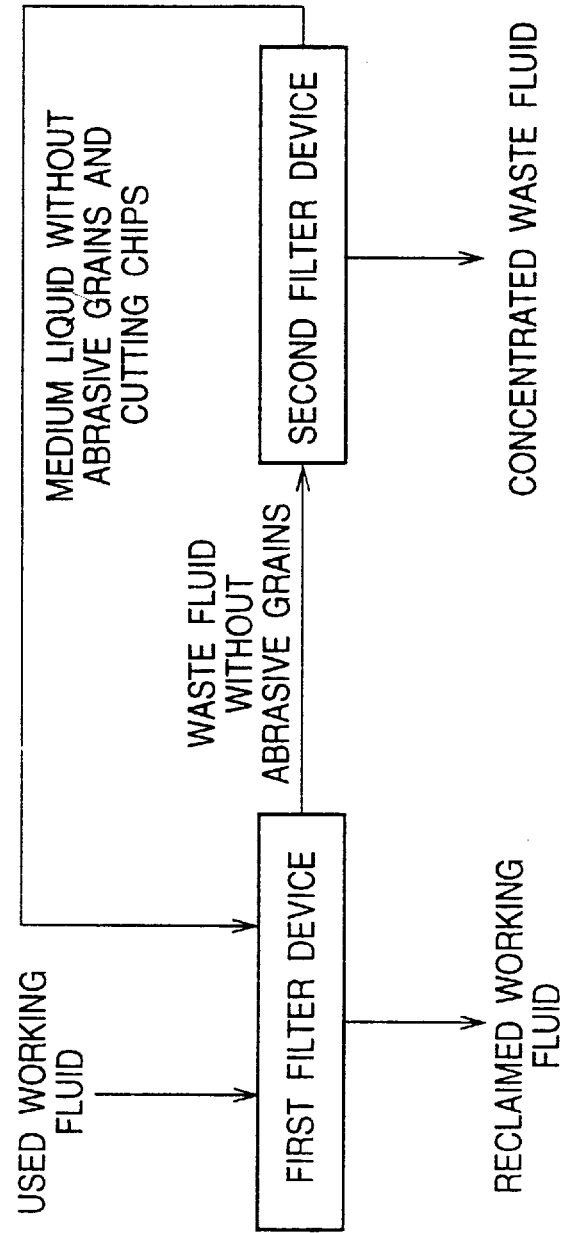
FIG. 1 is a functional block diagram indicating a principle of a method and an apparatus for reclaiming the used working fluid according to the present invention.

Referring to the functional block diagram of FIG. 1, there is shown a principle of a method of reclaiming a used working fluid according to the first aspect of the invention and an apparatus for reclaiming the used working fluid according to the third aspect of the present invention. A working fluid which has been used in abrasive machining contains abrasive grains and cutting chips dispersed therein. This used working fluid is processed by a first filter device so that the used working fluid is separated into a reclaimed working fluid which has a low concentration of the cutting chips, and a waste fluid which does not contain the abrasive grains. The reclaimed working fluid is adjusted in its concentration of the abrasive grains as needed by adding a medium liquid which does not contain the abrasive grains, so that the reclaimed fluid is reused in the abrasive machining such as lapping. The waste fluid which does not contain the abrasive grains is processed by a second filter device so that the waste fluid is separated into a concentrated waste fluid having a high cutting chip concentration, and a medium liquid which does not contain the abrasive grains and cutting chips. The concentrated waste fluid is discarded, while on the other hand, the recovered medium liquid is utilized for adjusting the concentration of the used working fluid which is circulated in the first filter device, or for adjusting the abrasive grain concentration in the reclaimed working fluid as described above. There will be described in detail one example of the used working fluid reclaiming apparatus having the first and the second filter devices as described above.

Figure 2:
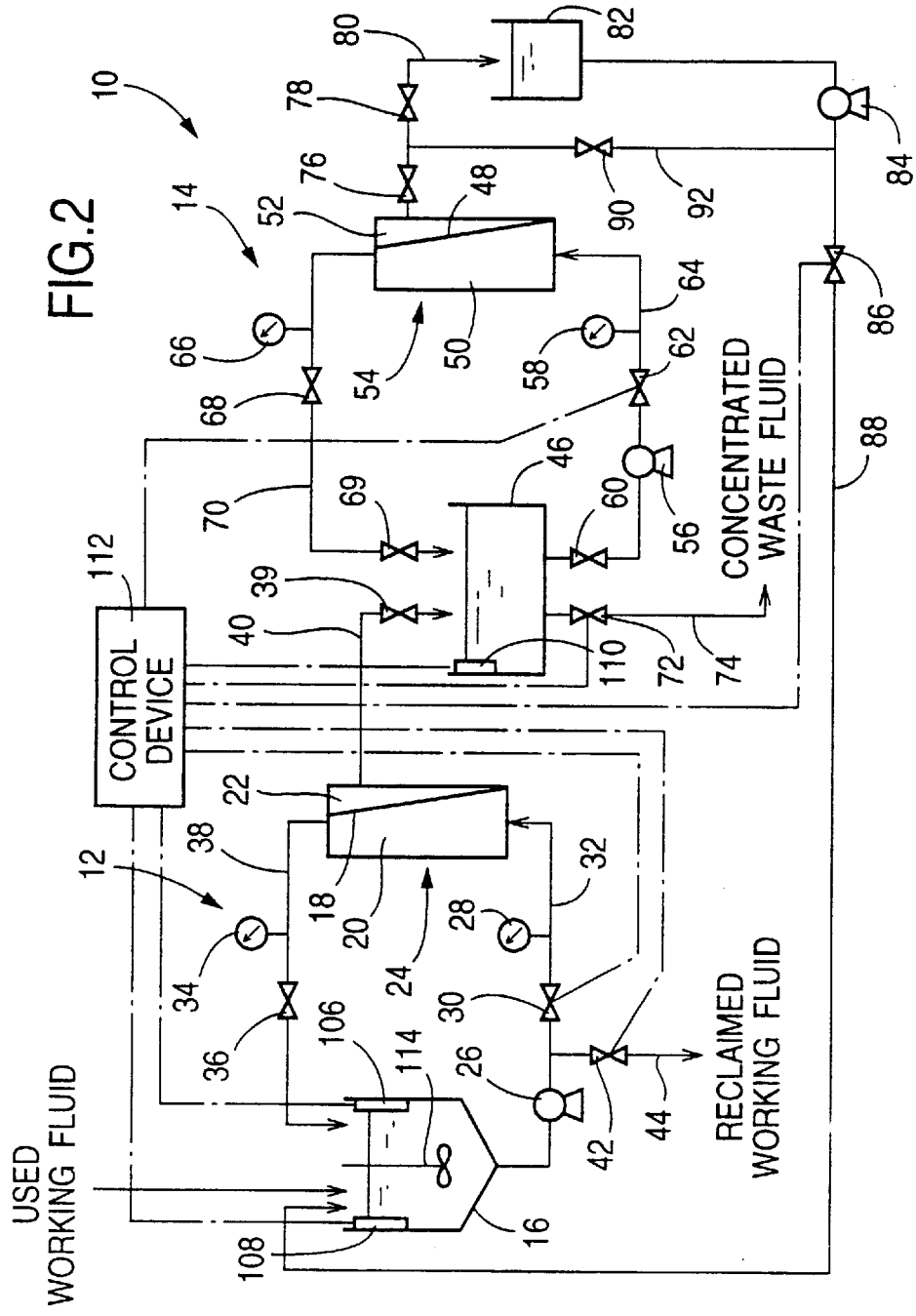
FIG. 2 is a view showing one embodiment of the reclaiming apparatus of the invention.

Referring to FIG. 2, there is shown one example of the used working fluid reclaiming apparatus indicated at 10. The reclaiming apparatus 10 includes a first filter device 12 and a second filter device 14. The working fluid which has been used in the abrasive machining is processed by the first filter device 12, so that the cutting chips are removed from the working fluid, to recover a reclaimed working fluid which contains the abrasive grains. The second filter device 14 is adapted to concentrate a waste fluid which is discharged from the first filter device 12 and which does not contain the abrasive grains, and to recover a medium liquid from the waste fluid. Thus, the second filter device 14 serves as a device for recovering the medium liquid. It is to be understood that upper and lower positions in FIG. 2 correspond to upper and lower parts of the apparatus in the actual installation.

The first filter device 12 includes a first reservoir 16 for storing the working fluid which has been used in a lapping device not shown, for instance, and a first filter 24 having a first chamber 20 and second chambers 22, which chambers 20, 22 are separated from each other by filtration films 18. The first filter device 12 has a first supply passage 32, a first return passage 38, a waste fluid passage 40, and a recovery passage 44. The first supply passage 32 has a circulating pump 26, a pressure gage 28 and a valve 30, and connects the first reservoir 16 and an inlet of the first chamber 20 of the first filter 24. The first return passage 38 has a pressure gage 34 and a shut-off valve 36, and connects the first reservoir 16 and an outlet of the first chamber 20 of the first filter 24. The waste fluid passage 40 is connected to the second chambers 22 of the first filter 24 and has a shut-off valve 39. The recovery passage 44 is connected to the first supply passage 32, between the circulating pump 26 and the valve 30, and is provided with a shut-off valve 42. In the present embodiment, the first filter 24 and each of the filtration films 18 correspond to a cross flow filter and a cross flow filtration film, respectively, while the circulating pump 26 corresponds to a circulating device. Further, the first supply and the first return passages 32, 38 correspond to a first circulating path or a circulating path, while the shut-off valve 42 and the recovery passage 44 correspond to a device for recovering a reclaimed working fluid.

The second filter device 14 includes a second reservoir 46 for storing the waste fluid which is fed through the waste fluid passage 40 and which does not contain the abrasive grains, and a second filter device 54 having a first chambers 50 and a second chamber 52, which chambers 50, 52 are separated from each other by filtration films 48. The second filter device 14 has a second supply passage 64, a second return passage 70, a discharge line 74, and a filtrate passage 80. The second supply passage 64 connects the second reservoir 46 and inlets of the first chambers 50 of the second filter 54, and has a circulating pump 56, a pressure gage 58 and shut-off valves 60, 62. The second return passage 70 connects the second reservoir 46 and outlets of the first chambers 50 of the second filter 54, and has a pressure gage 66 and shut-off valves 68, 69. The discharge line 74 has a shut-off valve 72 and is connected to the second reservoir 46. The filtrate passage 80 is provided with shut-off valves 76, 78, and is connected to the second chamber 52 of the second filter 54. The second filter device 14 further has a filtrate reservoir 82 for storing a filtrate, in other words, a medium liquid supplied through the filtrate passage 80, which does not contain the abrasive grains and cutting chips. In the present embodiment, the second filter 54 corresponds to a filtering device, while the second supply passage 64 and the second return passage 70 correspond to a second circulating path. Further, the shut-off valve 72 and the discharge line 74 correspond to a device for discharging a concentrated waste fluid, while the filtrate reservoir 82 corresponds to a medium liquid reservoir.

To the filtrate reservoir 82, there is connected a feed passage 88 having a feed pump 84 and a shut-off valve 86. This feed passage 88 is adapted to feed the medium liquid in the filtrate reservoir 82 which does not contain the abrasive grains and cutting chips, to the first reservoir 16. The second filter device 14 further has a backwash passage 92 having a shut-off valve 90, which is connected to the filtrate passage 80, between the valve 76 and the valve 78. The backwash passage 92 is further connected to the feeding passage 88, between the feeding pump 84 and the shut-off valve 86. Thus, the the filtrate passage 80 is connected to the feeding passage 88 via the backwash passage 92. In the present embodiment, the feeding pump 84 corresponds to a feeding device for feeding the medium liquid, while the shut-off valve 86 corresponds to a fluid flow control valve for controlling an amount of the medium liquid which is supplied to the first reservoir 16. Further, the feeding passage 88 corresponds to a medium liquid supply passage.

Figure 3:
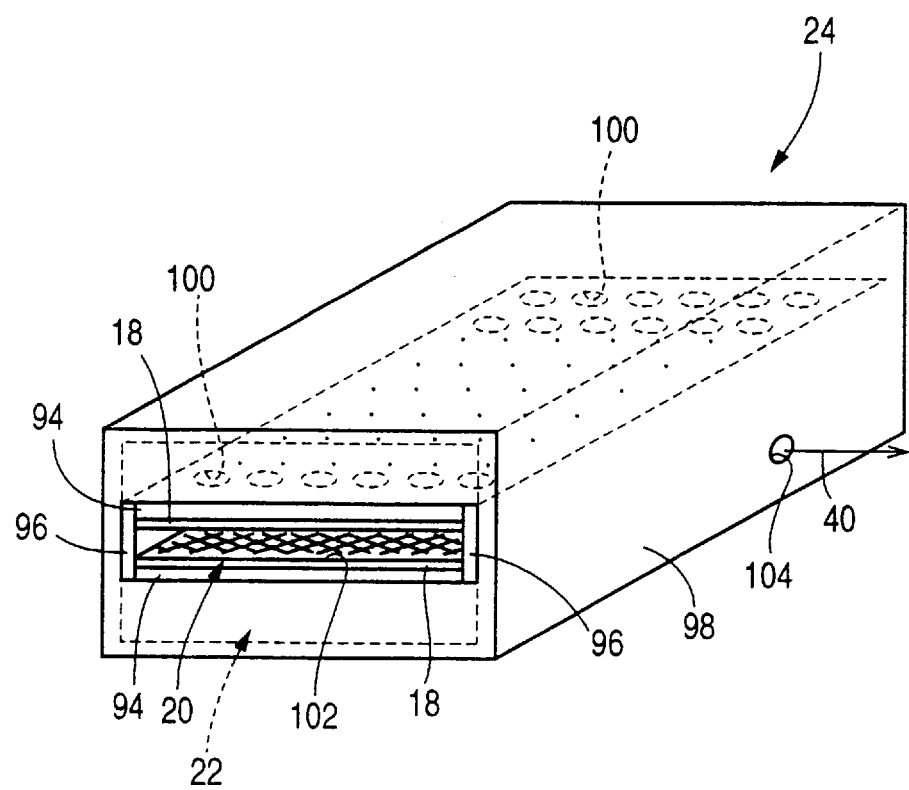
FIG. 3 is a view showing a first filter used in the reclaiming apparatus of FIG. 2.

As shown in FIG. 3, the first filter 24 has: a pair of punching metal sheets 94, 94 which are made of a stainless steel, for instance, and whose opposed surfaces are covered with respective filtration films 18, 18, each of which is formed of a single layer of stainless mesh, for instance; and a pair of stainless side plates 96, 96 which connect the pair of punching metal sheets 94, 94 at their side ends, with the punching metal sheets 94, 94 spaced away from each other by about 10 mm, so as to form a hollow rectangular parallelepiped which gives the first chamber 20 therein having a rectangular cross sectional shape as shown in FIG. 3. The first filter 24 further has a casing 98 in which the above formed rectangular parallelepiped is accommodated, so as to provide the above-described second chambers 22. The size of the mesh openings of the stainless mesh of each filtration film 18 is suitably determined depending upon the average grain size of the abrasive grains in the used working fluid which is subject to the reclaiming treatment. That is, the size of the mesh openings of the stainless mesh is determined such that it is sufficiently smaller than the grain size of the abrasive grains and is sufficiently larger than the grain size of the cutting chips.

The first chamber 20 and the second chambers 22 of the first filter 24 are brought into communication with each other through only the mesh openings of the filtration films 18, 18 and holes 100 formed through each punching metal sheet 94. The first supply passage 32 is connected to an opening 102 of the first chamber 20 while the first return passage 38 is connected to a similar opening of the first chamber 20 (not shown) which is formed on the other end. The casing 98 has a connecting hole 104 formed through the casing 98. The waste fluid passage 40 as described above is connected to the connecting hole 104.

The second filter 54 is a ceramic filter which is constituted by a cylindrical main body formed of a porous alumina ceramic, for example. The main body has a multiplicity of axial through-holes whose inner circumferential surfaces are provided with the respective filtration films 48 mentioned above. The thus constructed second filter 54 is connected to the second supply passage 64 at one of opposite axial ends of each axial through-hole, and is connected to the second return passage 70 at the other axial end of each axial through-hole. The size of pores of each filtration film 48 is suitably determined according to the average grain size of the cutting chips which varies depending upon the working condition, such that the size of the pores is sufficiently smaller than the average grain size of the cutting chips.

The first reservoir 16 has a level gage 106 for detecting an amount of the used working fluid stored in the first reservoir 16 and a densimeter 108 for detecting the concentration of the used working fluid, while the second reservoir 46 in the second filter device 14 has a densimeter 110 for detecting the concentration of the waste liquid stored therein. The level gage 106 and the densimeters 108, 110 are connected to a control device 112. The shut-off valve 30 in the first supply passage 32, shut-off valve 42 in the recovery passage 44, shut-off valve 62 in the second supply passage 64, shut-off valve 72 in the discharge line 72, and shut-off valve 86 in the feeding passage 88 are solenoid-operated shut-off valves, for instance, which are electrically controlled. These shut-off valves 30, 42, 62, 72 and 86 are also connected to the control device 112.

The control device 112 controls the above-described valves 30, etc. to be selectively placed in an open position and a closed position so as to adjust the concentration of the used working fluid flowing through the first circulating path, recover the reclaimed working fluid, and discharge the concentrated waste fluid. The operation of the control device 112 for opening and closing the shut-off valves is based on the amount of the used working fluid in the first reservoir 16 detected by the level gage 106, the concentrations of the used working fluid in the first reservoir 16 which is detected by the densimeter 108, and the concentration of the waste fluid in the second reservoir 46 which is detected by the densimeter 110. In FIG. 2, the reference numeral 114 denotes a stirring member 114 for stirring the used working fluid in the reservoir 16.

There will be next described a process of reclaiming the used working fluid which is effected by the thus constructed reclaiming apparatus 10 based on the operation of the control device 112.

The used working fluid to be processed by the reclaiming apparatus 10 is obtained as a result of an abrasive machining operation such as a lapping is performed on a silicon wafer, for instance, by using a working fluid which contains abrasive grains such as GC of #1000 size (having an average grain size of about 10 $\mu$m) dispersed in a lapping liquid of kerosene, for instance, (hereinafter referred to as a "medium liquid"), so as to have an abrasive grain concentration of 1.6 kg/l. The used working fluid is contaminated with cutting chips or swarf of silicon having an average grain size of about 1.0 $\mu$m. The cutting chips are contained in the used working fluid in a concentration of 0.5 kg/l, for example, which deteriorates the quality of the processed workpiece and the working efficiency.

Each of the filtration films 18 is made of a so-called twill weave stainless mesh which has pores having nominal filtration accuracy of about 5 $\mu$m (in other words, having mesh openings of about 5 $\mu$m). Each of the filtration films 48 has pores of about 0.2 $\mu$m. That is, the size of the mesh openings of the filtration film 18 is determined to be about a half of the average grain size of the abrasive grains, which is about 10 $\mu$m, while the size of the pores of each filtration film 48 is determined such that the pores are sufficiently smaller than the average particle size of the cutting chips, which is about 1.0 $\mu$m.

In operation of the reclaiming apparatus 10, the used working fluid is fed into the first reservoir 16. The circulating pump 26 is actuated with the shut-off valves 36, 39 being placed in the open position. Then, the control device 112 controls the shut-off valve 30 to be placed in the open position. In this state, the shut-off valve 42 is kept closed. Accordingly, the used working fluid stored in the first reservoir 16 is circulated through a circulating path (first circulating path) defined by the first supply passage 32, first filter 24, and first return passage 38. Within the first filter 24, the used working fluid is fed along the surface of each filtration film 18. The opening amount of the shut-off valves 30, 36 is determined such that a filtering pressure is a suitable value, generally about 0.5–2.0 kg/cm$^2$ (e.g., about 1.0 kg/cm$^2$) which is determined depending upon the concentration of the used working fluid, and such that the flow rate of the used working fluid in the circulating path is about 1.0–3.0 m/s (e.g., about 2.0 m/s). The above-described filtering pressure is an average pressure value of the used working fluid in the first supply passage 32 and the first return passage 38. The shut-off valves 36, 39 may be opened and closed under the control of the control device 112. Further, the filtering pressure and rate of flow of the used working fluid through the circulating path may be controlled by an inverter which controls the discharging pressure and the delivery amount of the circulating pump 26.

The used working fluid flowing through the circulating path is partially discharged into the waste fluid passage 40 through the filtration films 18 of the first filter 24. Since the size of the mesh openings of the filtration films 18 is about 5 $\mu$m which is sufficiently smaller than the average grain size of the abrasive grains and is sufficiently larger than the average grain size of the cutting chips, the fluid transmitted through the filtration films 18 does not contain the abrasive grains and contains only the cutting chips. Namely, this waste fluid is discharged into the waste fluid passage 40, with the cutting chips being dispersed therein. In this arrangement, the waste fluid discharged into the passage 40 through the filtration films 18 always has the same cutting chip concentration as the working fluid flowing in the circulating path. Since the cutting chips are discharged with the waste fluid, the abrasive grain concentration of the used working fluid flowing in the circulating path is gradually increased, while the cutting chip concentration is kept at a constant level. In other words, the amount of the abrasive grains in the circulating working fluid is constant while only the amount of the cutting chips included therein is reduced. In this embodiment, a step of circulating the used working fluid with the shut-off valve 42 closed is a circulating step while a process of discharging the waste fluid into the passage 40 is a cross flow filtering step.

When the densimeter 108 detects that the amount of the cutting chips of the used working fluid in the circulating path is lowered to a predetermined value (which is equal to about 30% of the initial amount, for example), the control device 112 closes the shut-off valve 30 in the first supply passage 32 and opens the shut-off valve 42 in the recovery passage 44, so that a reclaimed working fluid whose cutting chip concentration is considerably lowered is recovered from the passage 44. The reclaimed fluid recovered as described above has an increased abrasive grain concentration since the medium liquid in the used working fluid is discharged together with the cutting chips through the first filter 24. Accordingly, the medium liquid which does not contain the abrasive grains and the cutting chips is added by a suitable amount to the used reclaimed working fluid, before or during circulation of the used working fluid through the circulating path, or to the reclaimed working fluid, so that the reclaimed working fluied has a suitable abrasive grain concentration (e.g., 1.6 kg/l which is equal to the nominal concentration value of the initially prepared working fluid). The manner of adding the medium liquid will be described. In the present embodiment, a process of recovering the reclaimed working fluid by opening the shut-off valve 42 is a step of recovering the reclaimed working fluid.

The waste fluid discharged into the passage 40 is stored in the second reservoir 46 of the second filter device 14. In the second filter device 14, the shut-off valves 60, 62, 68, 69, 76 and 78 are opened by the operation of the control device 112 or manually while the shut-off valves 72, 90 are in the closed positions. Then, the circulating pump 56 is actuated to circulate the stored waste fluid in a second circulating path defined by the second supply passage 64, second filter 54 and second return passage 70. Within the second filter 54, the waste fluid is fed along the surface of each filtration film 48, and the medium liquid which does not contain the abrasive grains and the cutting chips is transmitted through the filtration films 48 of the second filter 54. The transmitted medium liquid is stored in the filtrate reservoir 82 via the filtrate passage 80. Accordingly, the cutting chip concentration in the waste fluid flowing through the second circulating path is gradually raised.

When the densimeter 110 detects that the cutting chip concentration in the waste fluid has been lowered to a predetermined value, the control device 112 closes the shut-off valve 62 and opens the shut-off valve 72. Thus, a concentrated waste fluid is discharged from the discharge line 74. The above-indicated predetermined value of the cutting chip concentration is a value (e.g., 1.1 kg/l) below which the filtering efficiency is lower than a desired level and which varies depending upon the viscosity of the working fluid and the size of the cutting chips. In the present embodiment, a step of circulating the waste fluid in the second circulating path by closing the shut-off valves 72, 90 is a step of recovering the medium liquid. The cutting chip concentration of the waste fluid may be detected by any measuring means other than the densimeter 110. For example, a level gage similar to the level gage 106 may be provided in the second reservoir 46 to detect the amount of the waste fluid flowing in the second circulating path. Alternatively, the cutting chip concentration in the waste fluid is indirectly obtained from an amount of the medium liquid which has been fed into the filtrate passage 80. The concentrated waste fluid may be discharged from the discharge line 74 when a predetermined time has elapsed.

According to the present embodiment, the used working fluid is processed by the first filter device 12 having a comparatively simple construction, so that the abrasive grains in the used working fluid are recovered in the form of a suspension, namely, the reclaimed working fluid, while the amount of the cutting chips in the used working fluid is reduced. Thus, the useful abrasive grains can be efficiently utilized without being discarded. This arrangement assures efficient use of the abrasive grains, leading to reduction in the working cost. In the above first filter device 12, the mesh openings of the filtration films 18 of the first filter 24 are made sufficiently smaller than the average grain size of the abrasive grains. Since the first filter 24 employs a so-called cross flow filtration system, the used working fluid is fed over the surfaces of the filtration films 18. Thus, the abrasive grains in the used working fluid flowing through the circulating path are not deposited on the surfaces of the filtration films 18, and only the cutting chips are discharged into the waste fluid passage 40, together with the medium liquid.

The cross flow filtration system allows the filtration of the used working fluid having a relatively high abrasive grain concentration and a high viscosity suitable for improving the working efficiency in the abrasive machining, provided that values of the concentration and viscosity permit the used working fluid to be circulated in the circulating path (first circulating path). In contrast, the conventional reclaiming apparatus having the liquid cyclones is not capable of processing the used working fluid having a high abrasive concentration and a high viscosity. Namely, the conventional reclaiming apparatus allows the filtration of only a used working fluid having a relatively low abrasive grain concentration and a relatively low viscosity, because of the limited classification capability of the liquid cyclones utilizing the centrifugal force.

Since the size of the mesh openings of the filtration films 18 is selected to be about half of the grain size of the abrasive grains, those abrasive grains which have been crushed or worn into smaller grains are discharged together with the cutting chips, whereby the reclaimed working fluid which is further suitable for abrasive machining is recovered.

The waste fluid which does not contain the abrasive grains is discharged from the first filter device 12 and is processed by the second filter device 14, so that a substantial part of the medium liquid is recovered, and the amount of the medium liquid which is discarded together with the cutting chips is small, permitting easy disposal of the concentrated waste fluid and assuring a further reduced working cost.

Since each filtration film 18 of the first filter 24 in the first filter device 12 is formed of a single layer of stainless mesh, the cutting chips do not remain in the mesh openings of the filtration films 18 when the used working fluid including the cutting chips are passed through the filtration films 18. Thus, the filtration films 18 are not likely to be clogged with the cutting chips. Therefore, the first filter device 12 is capable of discharging, into the passage 40, the waste fluid having the same cutting chip concentration as the used working fluid flowing through the circulating path, over a relatively long period of time without replacing the filtration films 18 with new ones. On the contrary, if the filtration films 18 are formed of a relatively thick film, in other words, if the first filter 24 is formed of a ceramic filter such as the second filter 54 having the filtration films 48, or a laminated sintered wire-mesh filter, for example, the cutting chips are deposited within the filtration films, and as a result, the filtration films are clogged with the cutting chips. In this case, therefore, the cutting chips are not transmitted through the films, and the filtration films should be frequently replaced to recover the reclaimed working fluid whose cutting chip concentration is considerably lowered.

In the present embodiment, the second filter device 14 also employs the cross flow filtration system, wherein the filtration films 48 of the second filter 54 have pores which are sufficiently smaller than the average grain size of the cutting chips. In the second filter device 14 which employs the ceramic filter having the filtration films 48, the filtration films 48 do not tend to be clogged with the cutting chips due to the cross flow filtration system. Thus, the second filter device 14 assures effective filtration of the waste fluid for a long period without frequently replacing the filtration films 48 with new ones.

The concentration of the abrasive grains in the used working fluid increases while it is circulated through the circulating path of the first filter device 12. Therefore, it is necessary to add the medium liquid which does not contain the abrasive grains and the cutting chips, to the reclaimed working fluid, or alternatively to the used working fluid during circulation thereof through the circulating path, so that the reclaimed working fluid has the abrasive grain concentration suitable for the abrasive machining. There will be described the manners of adding the medium liquid.

Figure 4:
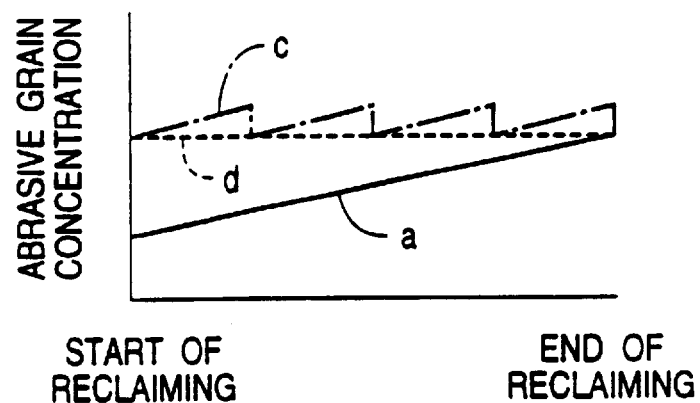
FIGS. 4(a) and 4(b) are views for explaining filtering methods effected in the reclaiming apparatus of FIG. 2.
Figure 4:
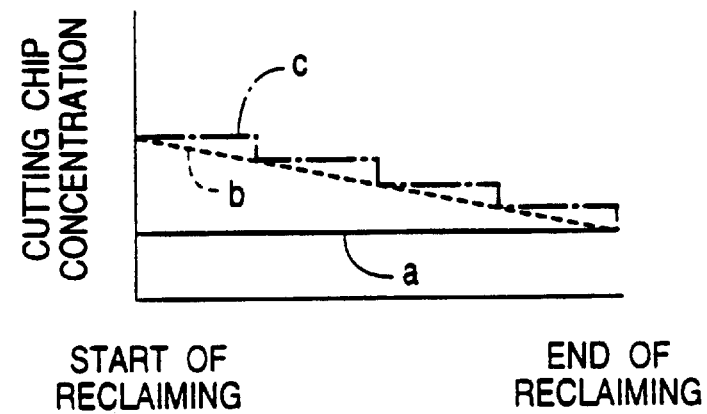

The graphs of FIG. 4(*a*) and 4(*b*) indicate changes in the concentrations of the used working fluid where the medium liquid which does not contain the abrasive grains and the cutting chips is added to the used working fluid flowing in the circulating path, by three different methods. The graph of FIG. 4(*a*) shows the changes in the abrasive grain concentration, while the graph of FIG. 4(*b*) shows the changes in the cutting chip concentration.

A change pattern "a" indicated by a solid line in the graphs is obtained when a large amount of the medium liquid is initially added to the used working fluid. The amount of the medium liquid initially added to the used working fluid is determined depending on the amount of the used working fluid and the desired amount of the cutting chips to be removed. For instance, if it is desired to lower the cutting chip concentration to 0.15 kg/l when the used working fluid having the abrasive grain concentration of 1.6 kg/l and the cutting chip concentration of 0.5 kg/l is processed (in other words, if it is desired to lower the cutting chip concentration to a value which is about 30% of the initial concentration value), the amount of the medium liquid to be added is 2.3 times that of the medium liquid in the used working fluid. (When 200 l of the used working fluid contain 320 kg of abrasive grains and 100 kg of cutting chips, 460 l of medium liquid is added to the used working fluid so as to reduce the amount of the cutting chips to 30 kg.)

Accordingly, the used working fluid in the first reservoir 16 has a lowered abrasive grain concentration of 0.48 kg/l and a lowered cutting chip concentration of 0.15 kg/l. In this method, the filtering circulation of the used working fluid in the first filter device 12 is initiated after the cutting chip concentration is lowered to the desired value. The abrasive grain concentration is gradually raised from the value of 0.48 kg/l as the medium liquid is discharged together with the cutting chips. When the abrasive grain concentration reaches the initial value of 1.6 kg/l, the filtering operation effected by the first filter device 12 is terminated and the reclaimed working fluid is recovered from the circulating path. It is noted that the cutting chip concentration is always constant during the filtering operation.

According to the change pattern "a", the first reservoir 16 is required to have a comparatively large storage capacity. In the above example, the capacity of the first reservoir 16 should be 600 l, that is, 3.3 times 200 l of the used working fluid. In this method, however, both of the abrasive grain concentration and the cutting chip concentration of the used working fluid to be circulated are made relatively low, assuring a relatively high filtering speed. Further, the required delivery pressure of the circulating pump 26 is not so high. Although a large amount of the medium liquid is added to the used working fluid in this case, most of the medium liquid used can be fed from the filtrate reservoir 82 to which the medium liquid is supplied from the second filter device 14. The medium liquid fed from the filtrate reservoir 82 to the first reservoir 16 is used for lowering the abrasive grain concentration and the cutting chip concentration as described above, assuring efficient utilization of the medium liquid. Described specifically, the waste fluid containing the cutting chips dispersed in the medium liquid is processed by the second filter device 14 and the medium liquid is recovered as a filtrate. As a result, the waste fluid is concentrated to such an extent that the cutting chip concentration is equal to 1.1 kg/l, for instance. In this case, the amount of the medium liquid included in the concentrated waste fluid is about 13% of the amount of the added medium liquid. Namely, the medium liquid to be discarded with the cutting chips is as small as 60 l in the above example.

According to the change pattern "a", when the level gage 106 provided in the first reservoir 16 detects that the amount of the used working fluid in the circulating path (first circulating path) is equal to the initial value (200 l in the above example), the control device 112 closes the shut-off valve 30 in the first supply passage 32 and opens the shut-off valve 42 in the recovery passage 44, whereby the reclaimed working fluid is obtained. In this respect, it is not necessary to detect the cutting chip concentration, and the densimeter 108 may be dispensed with.

However, the above arrangement may be modified such that the reclaimed working fluid is recovered when the cutting chip concentration obtained from the specific gravity of the used working fluid which is detected by the densimeter 108 becomes equal to a predetermined value. Alternatively, a level gage may be provided in the waste fluid passage 40 for detecting the amount of the waste fluid which has been discharged into the passage 40, and the reclaimed working fluid is recovered when the detected amount becomes equal to the amount of the medium liquid which has been added to the used working fluid. In these cases, the level gage 106 may be dispensed with. According to the change pattern "a", therefore, it is necessary to directly or indirectly detect that the amount of the waste fluid discharged into the waste fluid passage 40 becomes equal to that of the medium liquid which has been initially added to the used working fluid.

There will be explained a second change pattern "b" indicated by a broken line in the graphs. In this change pattern "b", unlike the above-described first change pattern "a", the medium liquid is not added to the used working fluid in the first reservoir 16 before the used working fluid is circulated in the first filter device 12. The medium liquid is continuously added to the used working fluid in the first reservoir 16 depending on the amount of the waste fluid discharged into the waste fluid passage 40 through the filtration films 18. In this respect, the abrasive grain concentration in the used working fluid is kept constant as shown in the graph of FIG. 4(a) while the cutting chip concentration is gradually lowered since the waste fluid including the cutting chips is discharged and the medium liquid without the abrasive grains and the cutting chips is added to the used working fluid.

In this change pattern "b", when the level gage 106 in the first reservoir 16 detects a change in the stored amount of the used working fluid, the control device 112 opens the shut-off valve 86, permitting the medium liquid in the filtrate reservoir 82 to be supplied to the first reservoir 16 via the feeding passage 88. When the amount of the fluid in the first reservoir 16 returns to the initial value by addition of the medium liquid thereto, the control device 112 closes the shut-off valve 86 to terminate the feeding of the medium liquid. The above operation is repeatedly implemented during the filtration of the used working fluid effected by the first filter device 12 so that the amount of the fluid flowing in the circulating path (first circulating path) is kept substantially constant, and the abrasive grain concentration in the fluid is kept at a substantially constant level. Subsequently, when the densimeter 108 detects that the cutting chip concentration of the used working fluid becomes equal to the predetermined value, the control device 112 closes the shut-off valve 30 and opens the shut-off valve 42, whereby the reclaimed working fluid is taken out from the passage 44.

According to this change pattern "b", the capacity of the first reservoir 16 is sufficient as long as the used working fluid to be processed by the first filter device 12 can be stored therein, and the first reservoir 16 need not have a relatively large capacity. Since the abrasive grain concentration does not exceed the constant level, the load acting on the circulating pump 26 is kept substantially constant so that the pump 26 is not required to have a high delivery pressure. In the change pattern "b", the abrasive grain concentration in the circulating used working fluid is always higher throughout the filtering operation than the abrasive grain concentration according to the above change pattern "a". However, the desired or final value of the abrasive grain concentration according to the change pattern "b" is the same as that of the abrasive grain concentration according to the change pattern "a". Therefore, the required delivery pressure of the circulating pump 26 for the change pattern "b" is almost the same as that for the change pattern "a".

In this change pattern "b", the cutting chip concentration may be directly obtained from the specific gravity of the cutting chips detected by the densimeter 108 in the first reservoir 16. However, the cutting chip concentration may be indirectly obtained from the amount of the waste fluid discharged into the passage 40, on the basis of suitable test data. In this case, a level gage is provided in the waste fluid passage 40 for detecting the amount of the waste fluid discharged into the passage 40.

Next, there will be described a third change pattern "c" indicated by a one-dot chain line. In this change pattern "c", the medium liquid is added to the used working fluid in the first reservoir 16 by opening the shut-off valve 86 when the abrasive grain concentration of the used working fluid becomes relatively high, as in the change pattern "b". In this method, though the abrasive grain concentration is raised to a comparatively high value, this does not matter as long as the raised value of the abrasive grain concentration does not exceed a limit above which the used working fluid suffers from circulating flow. In this change pattern "c", too, the reclaimed working fluid is recovered when the cutting chip concentration obtained in a way as used for the change pattern "b" becomes equal to a predetermined value.

When the filtering operation is effected by the first filter device 12 according to the change pattern "c", the level gage 106, the densimeter 108 and the control device 112 need not exhibit a high operating accuracy.

Further, the shut-off valve 86 may be opened at a predetermined time interval, which is determined based on the filtering speed (the speed at which the waste fluid is discharged into the waste fluid passage 40) which is obtained in advance. Further, according to the change pattern "c", the abrasive grain concentration value may be temporarily lower than the initial value by an excessive amount of supply of the medium liquid. In this case, however, since the filtering speed decreases with an increase in the abrasive grain concentration, it is preferable to keep the abrasive grain concentration at a relatively low value.

As is understood from the above description of the present embodiment, the abrasive grain concentration in the circulating path (first circulating path) is indirectly obtained by the level gage 106 in the first reservoir 16 or the level gage (not shown) provided in the waste fluid passage 40, or directly obtained by the densimeter 108. In this respect, the level gage 106 and the densimeter 108 correspond to a device for obtaining the abrasive grain concentration while the control device 112 corresponds to a device for controlling the abrasive grain concentration. It is also noted that any method other than the three methods described above may be used to add the medium liquid to the reclaimed working fluid so as to attain the desired abrasive grain concentration, provided that the amount of the cutting chips in the used working fluid can be sufficiently reduced without adding the medium liquid during the filtering operation. However, as in the change pattern "c", this arrangement does not assure a high filtering efficiency.

Next, there will be described another embodiment of the invention. In the following description, the same reference numerals as used in the preceding embodiment are used to identify the corresponding components, and detailed explanation of which will be dispensed with.

Figure 5:
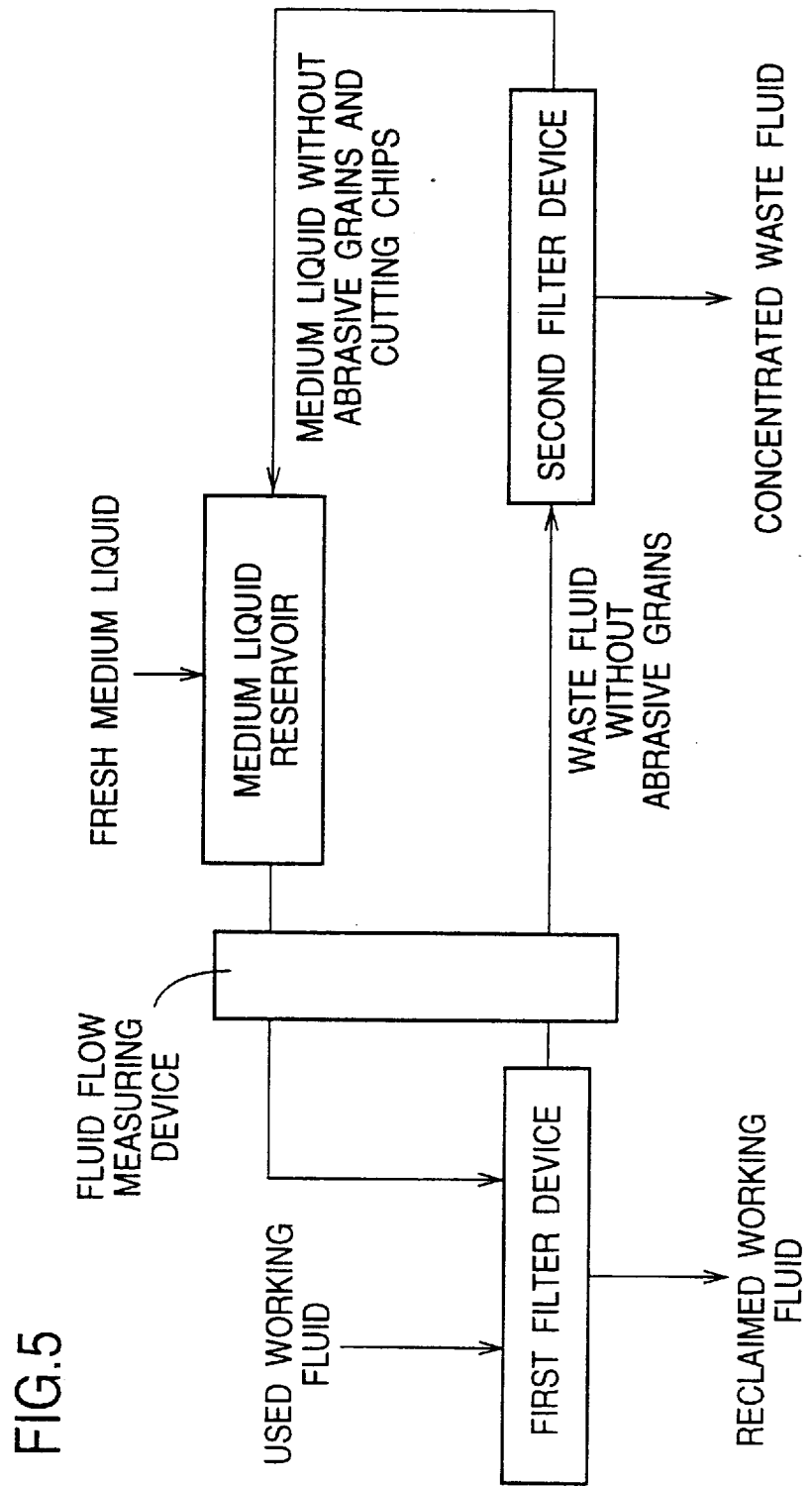
FIG. 5 is a functional block diagram indicating a principle of a method and an apparatus for reclaiming the used working fluid according to another embodiment of the present invention.

FIG. 5 is a functional block diagram indicating principles of a method of reclaiming the used working fluid according to second aspect of the invention and an apparatus for reclaiming the used working fluid according to a fourth aspect of the invention. A working fluid which has been used in abrasive machining contains the abrasive grains and the cutting chips dispersed therein. This used working fluid is processed by a first filter device so that the used working fluid is separated into a reclaimed working fluid which has a low concentration of the cutting chips, and a waste fluid which does not contain the abrasive grains. The reclaimed working fluid is used again in the abrasive machining such as lapping. The waste fluid which does not contain the abrasive grains is processed by a second filter device so that the waste fluid is separated into a concentrated waste fluid having a high cutting chip concentration, and a medium liquid which does not contain the abrasive grains and the cutting chips.

The concentrated waste fluid is discarded, while on the other hand, the medium liquid is stored in a medium liquid reservoir, and then supplied to the first filter device so as to be utilized for backwashing the filtration films of the first filter and for adjusting the concentrations of the used working fluid which is circulated in the first filter device. The amount of the medium liquid which is supplied from the medium liquid reservoir to the first filter device is made equal to the amount of the waste fluid which is discharged from the first filter device. These amounts of the medium liquid and the waste fluid are respectively measured by a fluid flow measuring device. The amount of the medium liquid in the reclaiming apparatus is reduced by an amount to be included in the concentrated waste fluid. Accordingly, the medium liquid is added to the medium liquid reservoir to compensate for the reduced amount. There will be described in detail one example of the used working fluid reclaiming apparatus having the first and the second filter device as described above.

Figure 6:
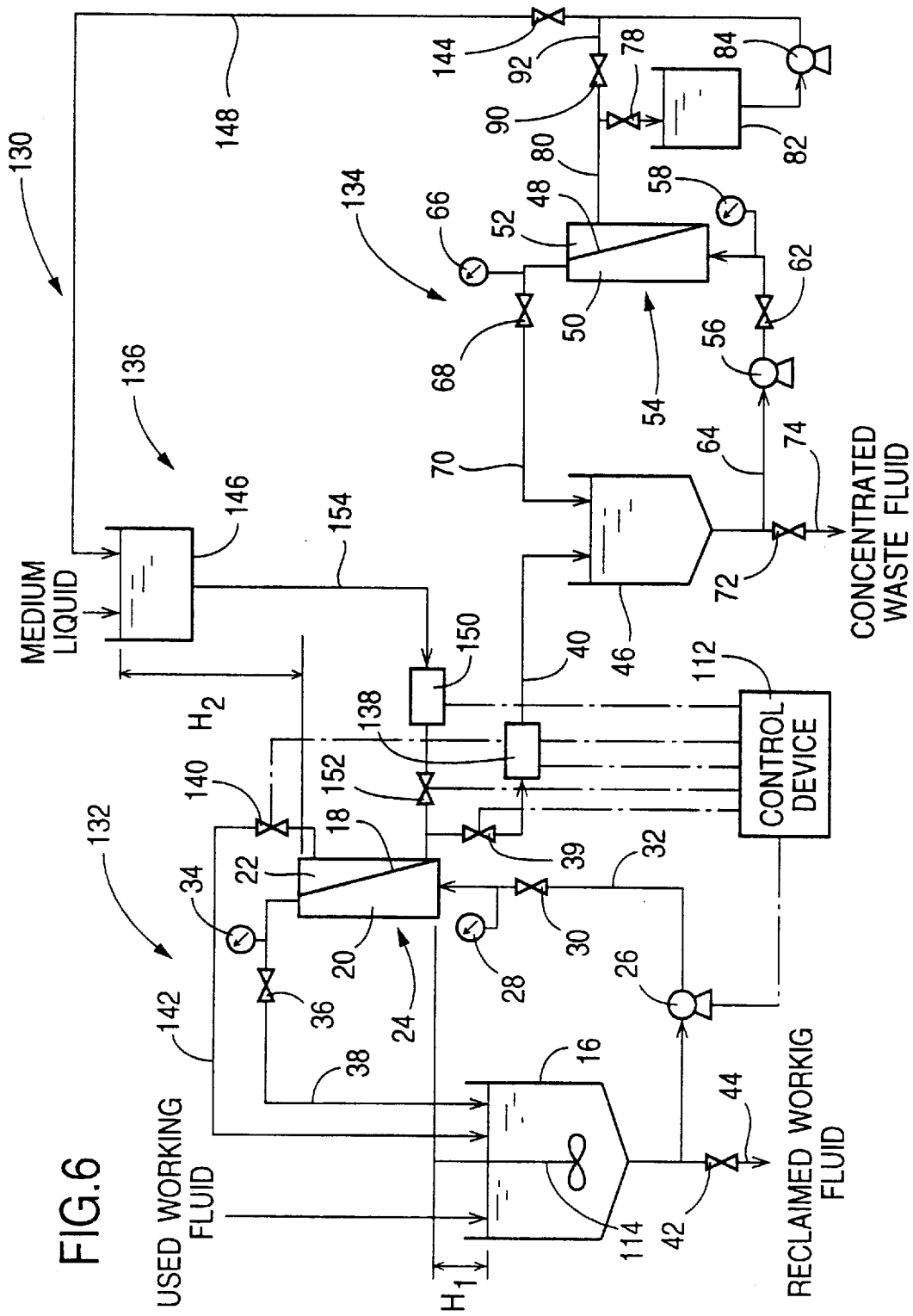
FIG. 6 is a view showing the reclaiming apparatus according to another embodiment of the invention.

Referring to FIG. 6, there is shown one example of a used working fluid reclaiming apparatus according to the present embodiment of the invention. The reclaiming apparatus 130 includes a first filter device 132, a second filter device 134 and a medium liquid supply device 136. The working fluid which has been used in the abrasive machining is processed by the first filter device 132, so that the cutting chips produced during the abrasive machining are removed from the working fluid. The first filter device 132 is adapted to obtain or recover a reclaimed working fluid which contains the abrasive grains. The second filter device 134 is adapted to concentrate a waste fluid which is discharged from the first filter device 132 and which does not contain the abrasive grains, and to recover a medium liquid from the waste fluid. Thus, the second filter device 134 serves as a device for recovering the medium liquid. The medium liquid supply device 136 is adapted to store the medium liquid recovered by the second filter device 134 and supply the same to the first filter device 132. It is to be understood that the upper and lower positions in FIG. 6 correspond to upper and lower parts of the apparatus in the actual installation.

The first filter device 132 has substantially the same construction as the first filter device 12 shown in FIG. 2. In the first filter device 132, the waste fluid passage 40 is connected to the lower end of the first filter 24. The waste fluid passage 40 has an integrating flowmeter 138 between the shut-off valve 39 and the second reservoir 46. The first filter device 132 further has a bypass passage 142 which has a shut-off valve 140 and which connects the upper ends of the second chambers 22 to the first reservoir 16. The recovery passage 44 is connected to the first supply passage 32, between the first reservoir 16 and the circulating pump 26.

The second filter device 134 has substantially the same construction as the second filter device 14 shown in FIG. 2. The second filter device 134 has a filtrate supply passage 148 which has the feeding pump 84 and a shut-off valve 144 and which connects the filtrate reservoir 82 to a a backwash fluid reservoir 146 which will be described. The backwash passage 92 having the shut-off valve 90 is connected to the filtrate passage 80, between the second filter 54 and the valve 78. The backwash passage 92 is further connected to the filtrate supply passage 148, between the feeding pump 84 and the valve 144.

The medium liquid supply device 136 has the backwash fluid reservoir 146 as described above and a backwash passage 154 which has an integrating flowmeter 150 and a shut-off valve 152 and which connects the backwash fluid reservoir 146 to the waste fluid passage 40, between the first filter 24 and the valve 39. In this embodiment, the backwash fluid reservoir 146 and the backwash passage 154 correspond to a medium liquid reservoir and a medium liquid supply passage, respectively, while the integrating flowmeters 138, 150 correspond to fluid flow measuring devices. Further, the backwash fluid reservoir 146, shut-off valve 152, backwash passage 154 and integrating flowmeters 138, 150 constitute a medium liquid supply device.

Figure 7:
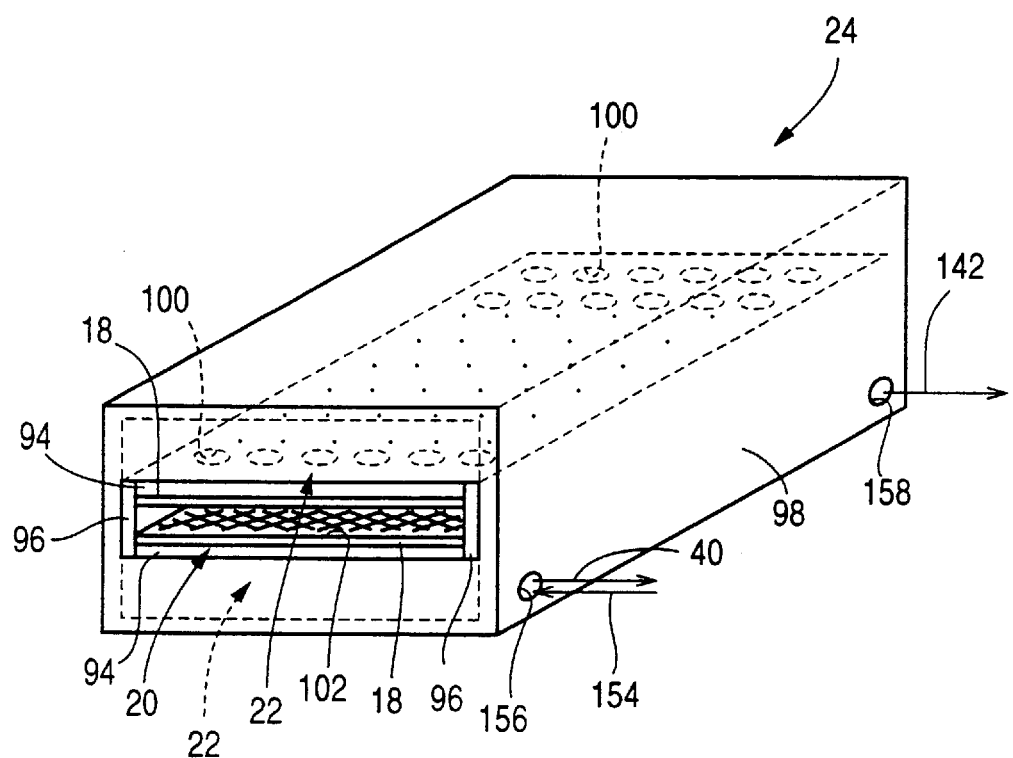
FIG. 7 is a view showing a first filter used in the reclaiming apparatus of FIG. 6.

The first filter 24 has substantially the same construction as the first filter 24 shown in FIG. 3. As shown in FIG. 7, however, the casing 98 has a connecting hole 156 formed at its end on the side of the opening 102. The waste fluid passage 40 and the backwash passage 154 are connected to the connecting hole 156. The casing 98 further has a connecting hole 158 at its end opposite to the connecting hole 156. The bypass passage 142 is connected to the connecting hole 158.

Referring back to FIG. 6, the first filter 24 of the present embodiment is disposed upright in the first filter device 12 such that one of the opposite ends of the first filter 24 on the side of the connecting hole 156 is located on the lower side while the other end of the first filter 24 on the side of the connecting hole 158 is located on the upper side. In other words, the filtration films 18 extend upright, so that the lower end of the first chamber 20 is flush with the lower ends of the second chambers 22. As shown in FIG. 6, the lower end of the first filter 24 is located above the level of the used working fluid in the first reservoir 16 by at least a distance H1 indicated in the figure, while the upper end of the first filter 24 is located below the level of the medium liquid in the backwash fluid reservoir 146 by at least a distance H2 indicated in the figure. It is noted that, in the upper second chamber 22 as shown in FIG. 7, connecting holes similar to the connecting holes 156 and 158 are formed at the opposite ends of the casing 98, respectively. These connecting holes are connected to the waste fluid passage 40 and the bypass passage 142.

The second filter 54 is similar to the one used in the embodiment of FIG. 2.

The shut-off valves 39, 140, 152 indicated above are motor-driven valves and are controlled by the control device 112, together with the circulating pump 26. The integrating flowmeters 138, 150 are also connected to the control device 112 and apply respective fluid flow signals to the control device 112. These flowmeters 138, 150 are reset by the control device 112.

Figure 8:
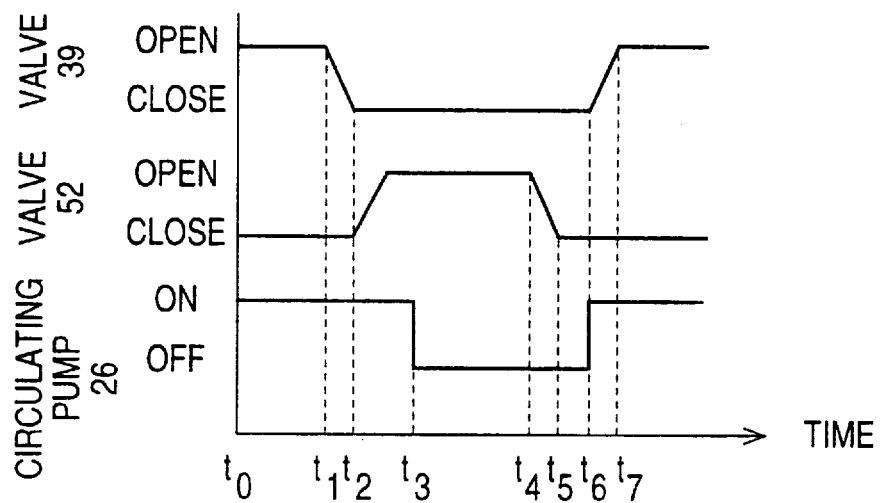
FIG. 8 is a time chart explaining a reclaiming process effected in the reclaiming apparatus of FIG. 6.

Referring to the time charts as shown in FIG. 8, there will be described a process of reclaiming the used working fluid, which is effected by the thus constructed reclaiming device 130, based on the operation of the control device 112. The used working fluid as processed in the embodiment of FIGS. 2–4 is processed by the reclaiming apparatus 130. Further, the filtering pressure and a flow rate of the used working fluid in the circulating path are set at the same values as in the preceding embodiment.

Initially, the used working fluid is fed into the first reservoir 16, while at the same time, the medium liquid which does not contain the abrasive grains and the cutting chips is fed into the backwash fluid reservoir 146. At a point of time t0 in the time chart of FIG. 8, the circulating pump 26 is actuated with the shut-off valve 30 in the first supply passage 32 and the shut-off valve 36 in the first return passage 38 being opened. Then, the control device 112 opens the shut-off valve 39 in the waste fluid passage 40, and resets the integrating flowmeters 138, 150 while the shut-off valve 152 in the backwash passage 154 remains closed. In this state, the used working fluid stored in the first reservoir 16 is circulated through a circulating path constituted by the first supply passage 32, first filter 24 and first return passage 38. Within the first filter 24, the used working fluid is fed along the surfaces of the filtration films 18. In this state, the shut-off valve 42 in the recovery passage 44 and the shut-off valve 140 in the bypass passage 142 are kept closed.

The shut-off valves 30, 36, 42 may be opened and closed under the control of the control device 112. Further, the filtering pressure and the flow rate of the used working fluid in the circulating path may be controlled by an inverter which controls the filtering pressure and the delivery amount of the circulating pump 26.

The used working fluid flowing through the circulating path is partially discharged, as a waste fluid, into the waste fluid passage 40 through the filtration films 18 of the first filter 24. The integrating flowmeter 138 detects an amount of the waste fluid which has been discharged into the second filter device 134. This waste fluid discharged into the passage 40 contains only the cutting chips, since the size of the mesh openings of the filtration films 18 is about 5 μm, which is sufficiently smaller than the size of the abrasive grains and is sufficiently larger than the size of the cutting chips. The waste fluid is discharged into the passage 40 with the cutting chips dispersed therein. In this arrangement, the discharged waste fluid always has the same cutting chip concentration as the used working fluid flowing in the circulating path.

Figure 9:
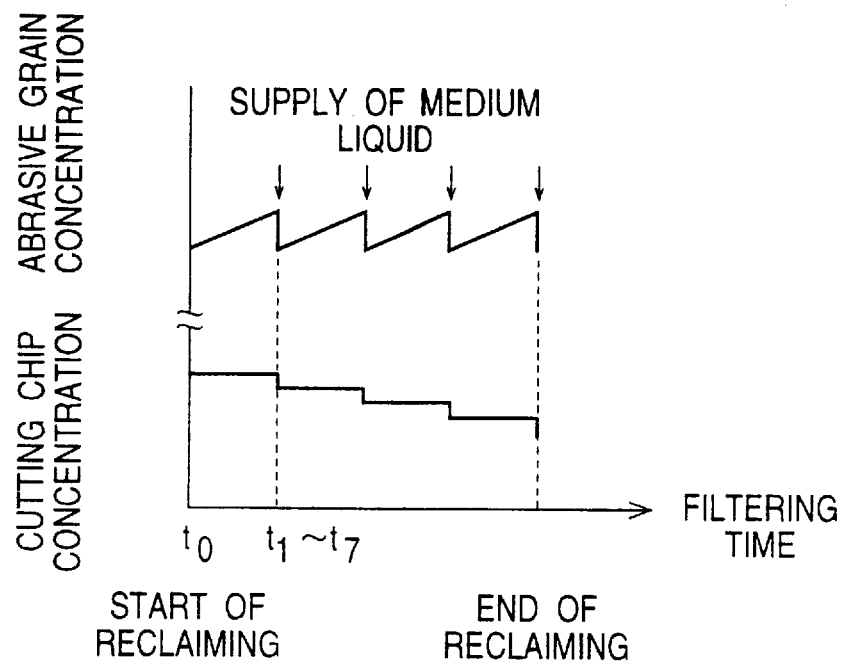
FIG. 9 is a view showing changes in the abrasive grain concentration and the cutting chip concentration in the used working fluid which is processed by the reclaiming apparatus of FIG. 6 according to the time chart of FIG. 8.

As shown in FIG. 9, the abrasive grain concentration in the used working fluid flowing in the circulating path is gradually raised during a time period of t0–t1 while the cutting chip concentration is kept at a constant level, since the waste fluid having a constant cutting chip concentration is discharged into the passage 40. In other words, the amount of the abrasive grains in the circulating used working fluid is constant while the amount of the cutting chips is gradually reduced. In the present embodiment, a step of circulating the used working fluid with the shut-off valves 42, 152 being closed corresponds to a circulating step while a step of discharging the waste fluid into the passage 40 corresponds to a cross flow filtering step.

At the point of time t1, the integrating flow meter 138 applies to the control device 112 a count-up signal Scu1 which indicates that the discharge amount of the waste fluid has reached equal to a predetermined value (e.g., 3–20 vol % of the initial amount of the used working fluid in the first reservoir 16). Upon receiving the signal Scu1, the control device 112 operates the motor-driven shut-off valve 39 to be placed in the closed position. After the shut-off valve 39 is closed, the control device 112 operates the shut-off valves 140, 152 to be placed in the open positions at a point of time t2. Accordingly, the backwash passage 154 in place of the waste fluid passage 40 is connected to the second chambers 22 of the first filter 24. The control device 112 opens the shut-off valve 152 after the shut-off valve 39 is closed, for the purpose of avoiding the reduction of the filtering efficiency of the device by inhibiting the medium liquid in the backwash fluid reservoir 146 from flowing into the waste fluid passage 40.

The level of the medium liquid in the reservoir 146 is made higher than the upper end of the first filter 24 by the distance H2. When the backwash passage 154 is connected to the second chambers 22 of the first filter 24 by opening the shut-off valve 152, the medium liquid in the reservoir 146 begins to be fed into the second chambers 22 via the backwash passage 154. In this condition, since the circulating pump 26 is still in its operating state, the first chamber 20 is full of the used working fluid supplied from the circulating pump 26. Accordingly, the medium liquid fed from the reservoir 146 is stored in the second chambers 22. The amount of the medium liquid flowing through the backwash passage 154 is measured by the integrating flowmeter 150.

When the control device 112 detects the elapse of a predetermined delay time as measured by an internal timer thereof, the control device 112 operates to turn off the circulating pump 26 at a point of time t3. As a result, the first chamber 20 is evacuated, and the medium liquid stored in the second chambers 22 is fed into the first chamber 20, so that a so-called backwashing of the filtration films 18 is initiated. The above-indicated predetermined delay time (t3—t2) is determined to be long enough to ensure that the second chambers 22 are completely filled with the medium liquid. Therefore, up to the point of time t3, the medium liquid supplied from the backwash fluid reservoir 146 to the second chambers 22 is discharged to the bypass passage 142 through the respective connecting holes 158 connected to the second chambers 22, and is supplied to the first reservoir 16.

The backwash passage 154 has a fluid flow diameter determined such that the rate of supply of the medium liquid to the second chambers 22 is sufficiently higher than the rate of transmission of the medium liquid through the filtration films 18. Accordingly, during the backwashing operation effected after the point of time t3, the amount of the medium liquid supplied from the reservoir 146 is excessive with respect to the filtering speed of the medium liquid through the filtration films 18. In this arrangement, the second chambers 22 are always full of the medium liquid, while at the same time, the excessive amount of the medium liquid is fed to the circulating path via the bypass passage 142. The connecting holes 158 and the bypass passage 142 also function as air vents for facilitating the supply of the medium liquid to the second chambers 22.

Thereafter, when the amount of the medium liquid measured by the integrating flowmeter 150 has reached a set value which is equal to the above-described predetermined value measured by the integrating flowmeter 138, the flowmeter 150 applies a count-up signal Scu2 to the control device 112 at a point of time t4. Upon receiving the signal Scu2, the control device 112 operates the shut-off valves 140, 152 to be placed in the closed positions. The shut-off valves 140, 152 are fully closed at a point of time t5. When the control device 112 detects the elapse of a predetermined time after the point of time t4, the control device 112 resets the integrating flowmeters 138, 150, actuates the circulating pump 26 and opens the shut-off valve 39. After a point of time t7, the operation effected during the time period of t0–t6 is repeated so that the first filter device 132 effects the filtering operation.

The above-indicated predetermined time is determined to be long enough to ensure that the shut-off valve 152 in the backwash passage 154 is fully closed and that the medium liquid stored in the second chambers 22 is entirely transmitted into the first chamber 20. In this embodiment, a step (in the time period of t3–t5) of turning off the circulating pump 26 while the shut-off valves 39, 152 are closed and opend, respectively, corresponds to a step of supplying the medium liquid.

The above-described operation is repeatedly implemented, and when a predetermined time has passed after the first filter device 132 is operated, the control device 112 turns off the circulating pump 26. FIG. 9 shows changes in the abrasive grain concentration and the cutting chip concentration in the used working fluid flowing through the circulating path for the reclaiming treatment. During the cross flow filtering process for the time period of t0–t1 of the filtering operation, the abrasive grain concentration is gradually raised while the cutting chip concentration is held at a constant level since the medium liquid is discharged. During the medium liquid supply step for the time period of t1–t7 which follows the cross flow filtering step, the medium liquid is supplied to the circulating path and therefore, the abrasive grain concentration returns to the initial value,. while on the other hand, the cutting chip concentration is lowered depending on the discharged amount of the waste fluid. Thereafter, the shut-off valve 42 in the recovery passage 44 is opened so that the reclaimed working fluid whose cutting chip concentration has been considerably lowered is recovered.

The above-described predetermined time is determined such that the cutting chip concentration of the used working fluid in the circulating path is lowered to a desired value after the above-described operation is repeatedly implemented. In the present embodiment, a step of recovering the reclaimed working fluid by opening the shut-off valve 42 corresponds to a step of recovering the reclaimed working fluid.

The waste fluid which is discharged from the first filter 24 into the passage 40 is stored in the second reservoir 46 in the second filter device 134. The waste fluid is processed by the second filter 54 as in the preceding embodiment, so that only the medium liquid (which does not contain the abrasive grains and the cutting chips) is stored in the filtrate reservoir 82 via the filtrate passage 80. On the other hand, the waste fluid whose cutting chip concentration has increased is consequently discarded from the discharge line 74.

The thus recovered medium liquid which does not contain the abrasive grains and the cutting chips is fed from the filtrate reservoir 82 to the backwash fluid reservoir 146 via the filtrate passage 148 when the feeding pump 84 is actuated with the shut-off valve 144 being opened. The medium liquid which is fed to the second chambers 22 via the backwash passage 154 includes the medium liquid discharged through the passage 40.

According to the present embodiment, the reclaiming apparatus 130 employs a cross flow filtration system constituted by the first supply passage 32, the first filter 24 having the filtration films 18 which inhibit the transmission of the abrasive grains therethrough and permit the transmission of the cutting chips, and the first return passage 38. In this arrangement, while the used working fluid is circulated in the circulating path by the circulating pump 26, a portion of the fluid is discharged from the first filter 24 together with the cutting chips. The reclaiming apparatus 130 further has the backwash fluid reservoir 146 for storing the medium liquid which does not contain the abrasive grains and the cutting chips, and the backwash passage 154 having the integrating flowmeter 150 and connecting the reservoir 146 to the second chambers 22 of the first filter 24. The medium liquid in the reservoir 146 is utilized for backwashing the filtration films 18. In the meantime, the waste fluid passage 40 has the integrating flowmeter 138 for measuring the amount of the waste fluid discharged into the waste fluid passage 40. In this arrangement, the amount of the medium liquid supplied from the reservoir 146 to the first filter device 132 is controlled to be equal to the amount of the waste fluid discharged from the first filter device 132. Accordingly, the used working fluid flowing in the circulating path of the first filter device 132 is recovered from the recovery passage 44 as the reclaimed working fluid which includes the medium liquid whose amount is kept at a substantially constant level.

The reclaimed working fluid recovered as described above has the same amounts of the medium liquid and the abrasive grains as those of the used working fluid which is initially fed into the first reservoir 16. However, the amount of the cutting chips in the reclaimed working fluid is reduced depending on the amount of the waste fluid discharged from the first filter 24, since the cutting chips are discharged into the waste fluid passage 40 through the first filter 24. In the reclaimed working fluid, the ratio of the amount of the cutting chips to the amount of the abrasive grains is significantly reduced, and therefore the abrasive grain concentration is maintained at the same level as in the used working fluid before processed by the first filter device 132. Thus, the reclaimed working fluid which is recovered according to the present embodiment can be utilized in the abrasive machining without adjusting the abrasive grain concentration.

According to the present embodiment, while the used working fluid is processed by the first filter device 132 and the medium liquid supply device 136 which are comparatively simple in construction, the amount of the cutting chips contained in the used working fluid is reduced with the abrasive grain concentration being maintained at the constant level. Since the abrasive grains are recovered in the form of a suspension in the reclaimed working fluid, the useful abrasive grains can be efficiently utilized without being discarded. Further, the medium liquid is supplied to the used working fluid in the circulating path by the medium liquid supply device 136 so that the reclaimed working fluid can be utilized in the abrasive machining without adjusting the abrasive grain concentration. Accordingly, the present arrangement assures effective utilization of the abrasive grains in the used working fluid and reduces the working cost.

In the cross flow filtration, generally, it is required to effect the backwashing of the filtration films 18 so that the medium liquid which does not contain the abrasive grains and the cutting chips is fed from the second chambers 22 into the first chamber 20 through the filtration films 18, for preventing the filtration films 18 from being clogged so as to assure a sufficient filtering flux, and permitting a smooth flow of the cutting chips through the filtration films 18. In the present embodiment, the medium liquid in the reservoir 146 is supplied to the second chambers 22 in the medium liquid supply step, so that the filtration films 18 are backwashed by the medium liquid supplied from the reservoir 146.

In the cross flow filtering process during the time period of t0–t1, the medium liquid is transmitted through the filtration films 18 together with the cutting chips. Accordingly, the abrasive grain concentration of the used working fluid which is flowing in the circulating path gradually increases with a decrease in the amount of the medium liquid, and the reclaimed working fluid recovered from the used working fluid inevitably has an increased abrasive grain concentration. Accordingly, it is necessary to add the medium liquid which does not contain the abrasive grains and the cutting chips, to the reclaimed working fluid so as to obtain the abrasive grain concentration suitable for abrasive machining. In the present embodiment, the medium liquid is supplied to the used working fluid in the circulating path via the second chambers 22 in the medium liquid supply step, so that the abrasive grain concentration of the reclaimed working fluid can be adjusted to a desired value. At the same time, the filtration films 18 can be backwashed.

In the present embodiment, the used working fluid flowing in the circulating path is eventually recovered as the reclaimed working fluid. In contrast to an ordinary cross flow filtration, it does not matter to supply the medium liquid which does not contain the abrasive grains and the cutting chips, to the circulating path while backwashing the filtration films 18. In this respect, it is possible to maintain a high filtering flux by frequently effecting the backwashing of the filtration films 18 (by performing the medium liquid supply step).

In the present embodiment wherein the bypass passage 142 is provided, the reservoir 146 overflows with the medium liquid due to a difference between the rate of flow of the medium liquid from the reservoir 146 and the rate of flow of the medium liquid through the filtration films 18. The excess of the medium liquid flows into the bypass passage 142, and is consequently fed into the circulating path. In the first filter device 132 of the present embodiment, the amount of the medium liquid which is required to backwash the filtration films 18 is about 1–10 $cm^3/cm^2$. On the other hand, the amount of the medium liquid to be supplied to the circulating path is determined depending on the amount of the waste fluid which is discharged into the waste fluid passage 40 in the cross flow filtering step. In case that the determined amount of the medium liquid to be supplied to the circulating path is larger than the required amount for backwashing the filtration films 18, it would be comparatively time-consuming if the determined amount of the medium liquid is entirely supplied through the filtration films 18. In the present embodiment having the bypass passage 142, however, the excessive amount of the medium liquid is supplied to the circulating path via the bypass passage 142 without passing through the filtration films 18, to thereby reduce the required time for the medium liquid supply step.

The waste fluid which does not contain the abrasive grains is discharged into the waste fluid passage 40, and is subsequently processed by the second filter device 134. That is, the waste fluid is filtered through the filtration films 48 having pores which are sufficiently smaller than the average grains size of the cutting chips. As a result, a substantial part of the medium liquid which does not contain the abrasive grains and the cutting chips is recovered from the waste fluid. The recovered medium liquid is fed into the backwash fluid reservoir 146 and is utilized in the medium liquid supply step. Accordingly, the medium liquid which has been discharged into the waste fluid passage 40 together with the cutting chips in the cross flow filtering step is recovered, and is eventually supplied to the circulating path. This arrangement assures further effective utilization of the medium liquid and further reduction in the working cost. Moreover, the amount of the concentrated waste fluid to be discarded is reduced, permitting easy disposal thereof. In the second filter device 134, a portion of the medium liquid is discarded together with the cutting chips when the concentrated waste fluid is discarded. However, since the waste fluid is concentrated to such an extent that the cutting chip concentration is equal to 1.1 kg/l, for instance, the medium liquid to be discarded is considerably small. In the present arrangement, a fresh medium liquid is suitably added to the backwash fluid reservoir 146 so as to compensate for the amount of the medium liquid to be discarded as the concentrated waste fluid.

In the medium liquid supply step, the circulating pump 26 is adapted to be turned off to stop the circulating flow of the used working fluid in the circulating path only after the second chambers 22 of the first filter 24 are filled with the medium liquid supplied from the backwash fluid reservoir 146. Before the second chambers 22 are filled with the medium liquid, the surfaces of the filtration films 18 are held under pressure of the used working fluid which is flowing in the circulating path. In this state, the medium liquid does not begin to flow from the second chambers 22 into the first chamber 20 through the filtration films 18. In other words, the backwashing of the filtration films 18 is initiated only after the second chambers 22 are filled with the medium liquid and the circulating pump is turned off. Accordingly, the entire surfaces of the filtration films 18 can be backwashed with high stability.

Described more specifically, when the backwashing of the filtration films is effected in an ordinary cross flow filter, the medium liquid begins to be supplied to the second chambers 22 after the circulating flow of the used working fluid is stopped (i.e., usually, after the circulating pump is turned off). Since it is required that the filtration films 18 of the first filter 24 have mesh openings which are comparatively large for permitting the cutting chips to pass therethrough, the medium liquid supplied to the second chambers 22 is immediately transmitted into the first chamber 20 through the filtration films 18 if the backwashing is effected in a similar way as effected in the ordinary cross flow filter as described above. In this case, since the medium liquid is transmitted to the first chamber 20 before the second chambers 22 are filled with the medium liquid, only the lower portions of the filtration films 18 are exclusively backwashed by the transmitted medium liquid. Accordingly, even after the second chambers 22 are filled with the medium liquid, the medium liquid tends to transmit through the lower portions of the filtration films 18 which have been backwashed by the medium liquid, due to a small flow resistance thereof at the lower portions. In this case, the upper portions of the filtration films may not be backwashed to a satisfactory extent. In contrast, in the present embodiment, the backwashing is initiated only after the second chambers 22 are filled with the medium liquid, whereby the filtration films 18 can be backwashed substantially uniformly over the entire surfaces.

In the present embodiment, the first filter 24 is disposed upright in the first filter device 132 such that the circulating path in the first filter 24 extends in the vertical direction and such that the lower end of the first filter 24 is located above the level of the used working fluid stored in the first reservoir 16 by the distance H1. In other words, the lower ends of the second chambers 22 are located above the lower end of the first chamber 20 and the fluid level of the first reservoir 16. After the predetermined amount of the medium liquid is supplied from the backwash fluid reservoir 146 to the second chambers 22, the medium liquid stored in the first and the second chambers 20 and 22 is entirely fed into the first reservoir 16 or the circulating path. Subsequently when the circulating pump 26 is actuated to circulate the used working fluid in the circulating path and a portion of the circulating fluid is discharged together with the cutting chips into the second chambers 22, the medium liquid which has been fed from the reservoir 146 is not left in the second chambers 22. Thus, the medium liquid supplied from the reservoir 146 is not discharged into the waste fluid passage 40 together with the waste fluid containing the cutting chips. Accordingly, the medium liquid supplied by the supply device 136 is entirely fed into the circulating path, whereby the amount of the medium liquid in the used working fluid flowing in the circulating path is kept at a substantially constant level.

The first filter 24 is disposed in the first filter device 132 such that the upper end of the first filter 24 is located below the fluid level of the medium liquid in the backwash fluid reservoir 146 by the distance H2. In this arrangement, the medium liquid fed from the reservoir 146 reaches the uppermost portion of the first filter 24 due to the water head difference H2. Namely, it is not required to provide a feeding device such as a pump in the backwash fluid passage 154 when the filtration films 18 are backwashed by the medium liquid fed from the reservoir 146. The filtration films 18 can be easily backwashed over the entire surfaces in the present apparatus having a simple construction. Though the water head difference H2 required for effecting the backwashing varies depending upon the viscosity of the medium liquid, the value H2 is generally determined to be about several tens of centimeters. For instance, the value H2 is about 25 cm in the present embodiment.

Since each of the filtration films 18 of the first filter 24 in the first filter device 132 is formed of a single layer of stainless mesh, the abrasive grains in the used working fluid and the cutting chips which transmit through the filtration films 18 are not likely to remain in the mesh openings of the filtration films 18. Even if some of the abrasive grains and the cutting chips remain in the mesh openings, the filtration films 18 are backwashed by the medium liquid supplied from the backwash fluid reservoir 146 in the medium liquid supply step, whereby the abrasive grains and the cutting chips are easily removed from the filtration films 18. Thus, the filtration films 18 are not clogged, and the waste fluid which is discharged into the passage 40 has the same cutting chip concentration as that of the used working fluid flowing through the circulating path over a relatively long period, even if the filtration films 18 are not frequently replaced.

Next, there will be described a further embodiment of the present invention.

Figure 10:
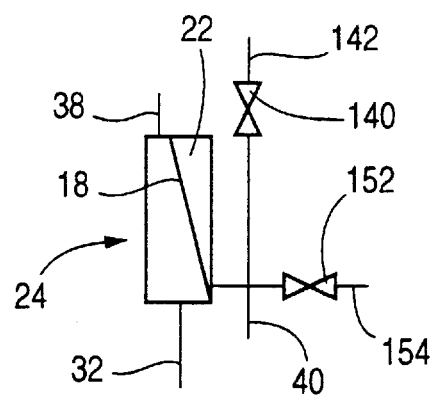
FIG. 10 is a view explaining a still another embodiment of the present invention, which corresponds to a part of FIG. 6.

Referring to FIG. 10, there is shown a principal part of the first filter device 132 according to the present embodiment, which is different from the embodiment of FIG. 6, in that the bypass passage 142 is connected directly to the waste fluid passage 40 (or to the backwash passage 154), rather than the second chambers 22 of the first filter 24. In this arrangement, the excessive amount of the medium liquid supplied from the reservoir 146 is fed to the first reservoir 16 via the bypass passage 142. The filtration films 18 are backwashed by the medium liquid supplied from the reservoir 146, while at the same time, the excessive amount of the medium liquid is supplied directly to the circulating path without flowing through the filtration films 18, leading to reduction in the required time for the medium liquid supply step. Thus, the entire amount of the medium liquid is not necessarily supplied to the circulating path via the second chambers 22. Namely, in the present embodiment, only a portion of the medium liquid is supplied to the second chambers 22 for backwashing the filtration films 18.

Figure 11:
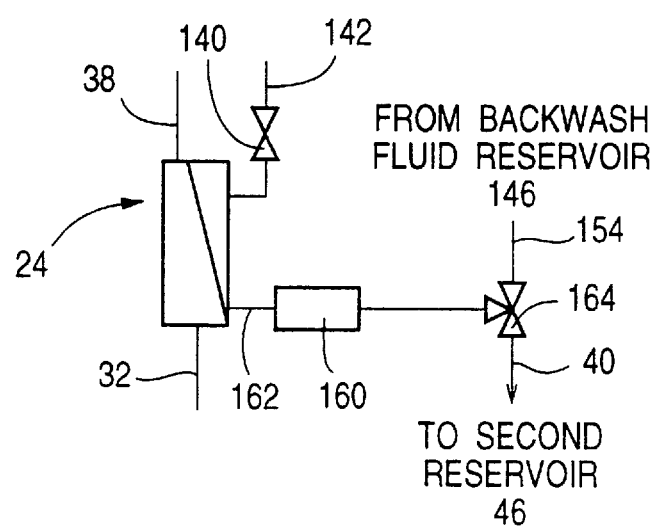
FIG. 11 is a view showing a principal part of yet another embodiment of the present invention, which corresponds to a part of FIG. 6.

Referring next to FIG. 11, there is shown a further embodiment of the present invention in which a single flowmeter 160 is provided in a supply.discharge line 162, in place of the integral flowmeters 138, 150 which are provided in the waste fluid passage 40 and the backwash passage 154, respectively, in the embodiment of FIG. 6. The flowmeter 160 is adapted to measure the amount of flow of the fluid flowing through the supply discharge line 162, in an adding or a subtracting direction depending on the fluid flow direction. More specifically described, when the waste fluid is discharged from the second chambers 22 into the waste fluid passage 40 in the cross flow filtering step, the flowmeter 160 measures the discharge amount of the fluid in the adding direction. On the other hand, when the medium liquid is supplied from the backwash passage 154 to the second chambers 22 in the medium liquid supply step, the flowmeter 160 measures the supply amount of the fluid in the subtracting direction. The supply-discharge line 162 is selectively connected to the waste fluid passage 40 and the backwash passage 154 via a three-way valve 164.

In operation of the thus constructed reclaiming apparatus, when the discharge amount of the waste fluid measured by the flowmeter 160 becomes equal to a predetermined value (e.g., the same value as in the preceding embodiment), a count-up signal Scu1 is applied to the control device 112, so that the three-way valve 164 is operated to connect the backwash passage 154 to the supply-discharge line 162. The flowmeter 160 measures in the subtracting direction the amount of the medium liquid which has flown through the supply-discharge line 162. When the measurement is zeroed (i.e., when the measured amount becomes equal to zero), a reset signal SR is applied to the control device 112 so that the the three-way valve 164 is switched so as to connect the waste fluid passage 40 to the supply-discharge line 162.

In the present embodiment wherein the flowmeter 160 is automatically reset to zero when the amount of subtraction of the flow amount becomes equal to the amount of addition of the flow amount, the control device 112 does not have to directly control the three-way valve 164 for selectively connecting the supply discharge line 162 to the waste fluid 40 and the backwash passage 154. In the preceding embodiment, it is required to control the timing of opening and closing the shut-off valves 39, 152.

Figure 12:
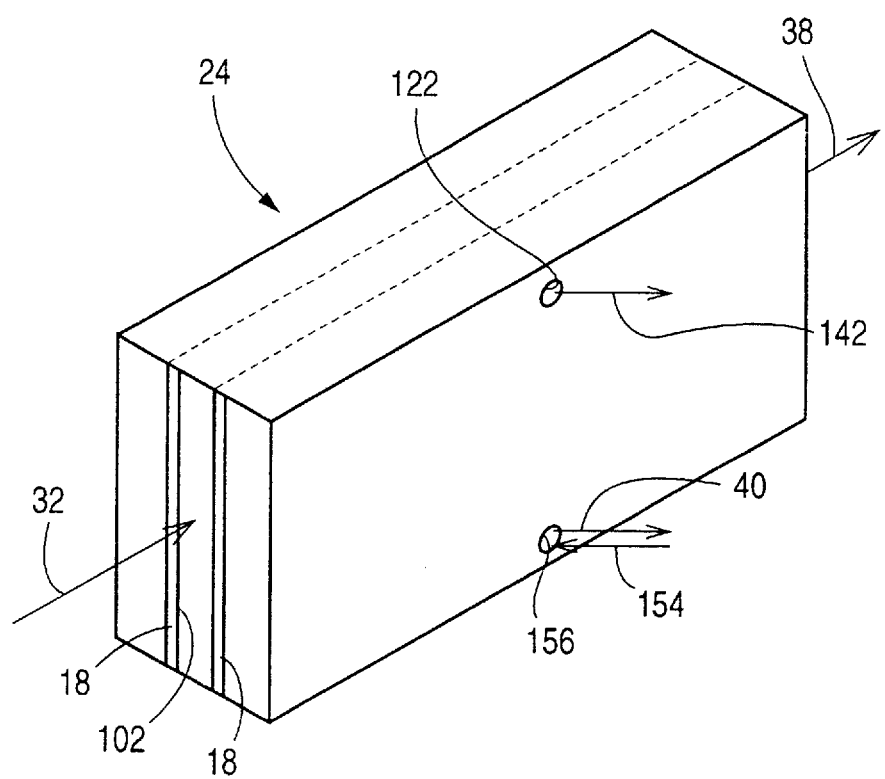
FIG. 12 is a view explaining another form of the first filter used in the reclaiming apparatus of FIG. 6.

Referring to FIG. 12, there is shown a modification of the first filter 24 used in the embodiment of FIG. 6. In the embodiment of FIGS. 6–9, the first filter 24 is disposed upright in the first filter device 132 such that the circulating path in the first filter 24 extends in the vertical direction as viewed in FIG. 6. In this modified form, the first filter 24 is disposed such that circulating path in the first filter 24 extends in the horizontal direction as seen in FIG. 12 and such that the connecting holes 156, 158 are respectively formed at the upper end and the lower end of the thus disposed first filter 24. In this case, too, the filtration films 18 extend upright so as to be in parallel with the circulating path and the lower ends of the second chambers 22 are flush with the lower end of the first chamber 20. As in the preceding embodiment, the first filter 24 is disposed in the first filter device 132 such that the lower ends of the second chambers 22 are located above the fluid level of the first reservoir 16 so as to provide the water head difference H1. Thus, the medium liquid supplied to the second chambers 22 in the medium liquid supply step is entirely fed into the circulating path, due to the water head difference H1. The circulating path may extend either in the vertical direction or in the horizontal direction, provided that the lower ends of the second chambers 22 of the first filter 24 are located above the lower end of the first chamber 20 and the fluid level in the first reservoir 16.

There have been described in detail some embodiments of the present invention referring to the drawings. It is to be understood that the present invention may be otherwise embodied.

In the illustrated embodiments, each of the filtration films 18 of the first filter 24 is formed of a single layer of stainless mesh. The filtration film 18 may be formed of a thin metal plate having pores formed by etching, for instance. Alternatively, the first filter 24 may be replaced by a ceramic filter as used in the second filter 54. However, from the standpoint of the open porosity and the durability of the filtration film, it is preferable to employ the stainless mesh for the filtration film 18. If the ceramic filter is used as the first filter 24, the filtration film tends to be clogged with the cutting chips and needs to be frequently backwashed by the medium liquid or replaced with a new one. In this respect, the single layer of stainless mesh as used in the illustrated embodiments is most preferably used for the filtration film 18 of the first filter 24.

Although the used working fluid reclaiming apparatus 10, 130 have the second filter device 14, 134, the second filter device may be eliminated. If the second filter device is not provided in the reclaiming apparatus 130 according to the embodiments of FIGS. 6–9, it is necessary to suitably add the medium liquid into the backwash fluid reservoir 146. In this case, the medium liquid may be a fresh medium liquid or a recovered medium liquid obtained by filtering the waste fluid which has been discharged into the waste fluid passage 40 through another filtering device. However, it is preferable to provide the second filter device 14, 134 for efficiently recovering the medium liquid from the waste fluid discharged from the first filter device 12, 132 into the waste fluid passage 40 and for reducing the amount of the concentrated waste fluid to be discarded.

The size of the mesh openings of the filtration film 18, i.e., the size of the pores of the filtration film 18 is suitably determined depending upon the average grain size of the abrasive grains in the used working fluid. Where the used working fluid contains GC abrasive grains of #600 size, for instance, the filtration film 18 having pores of about 20 $\mu$m is used. In this case, a plain woven stainless mesh is preferably used for the filtration film 18. In the illustrated embodiments, the pore size of the filtration film 18 is about a half of the average grain size of the abrasive grains. However, the pore size is suitably determined in the light of the filtering speed of the used working fluid and the recovering efficiency of the abrasive grains. For instance, the pore size may be in a range from ⅕ to ¾ of the average grain size of the abrasive grains. It is noted that the size of the cutting chips is about ⅕~1/20 of the size of the abrasive grains. In view of this, it is preferable that the pore size of the filtration film 18 be about ½~⅕ of the average grain size of the abrasive grains, for completely removing the cutting chips and recovering the useful abrasive grains. For increasing the filtering efficiency as high as possible, the pore size of the filtration film 18 is preferably about ¾~½ of the average grain size of the abrasive grains. In view of the above, it is most preferable that the pore size of the filtration film 18 be about ½ of the average grain size of the abrasive grains.

In the illustrated embodiments, the first filter device 12, 132 have a single first filter 24 and the second filter device 14, 134 have a single second filter 54. A plurality of filters may be provided in the first filter device 12, 132 and in the second filter device 14, 134, such that the filters are disposed in parallel or in series with the corresponding circulating path. In this case, the backwash passage 154 is connected to each of the plurality of the first filters 24, in the embodiment of FIGS. 6–9.

In the illustrated embodiments, the used working fluid to be processed is a working fluid which has the abrasive grain concentration of 1.6 kg/l and which has been used until the fluid has the cutting chip concentration of 0.5 kg/l. This used working fluid is processed to lower the cutting chip concentration to 0.5 kg/l. These concentration values are suitably changed according to the specific conditions of the abrasive machining in which the working fluid is used. When the medium liquid is added to the used working fluid in the circulating path according to the change pattern "a" as explained with reference to FIGS. 4 (*a*) and (*b*), the amount of the medium liquid to be added is changed as desired depending on the total amount of the used working fluid and the desired value of the cutting chip concentration in the reclaimed working fluid.

In the embodiment of FIGS. 2–4, the first filter device 12 may be provided with a reservoir for storing fresh medium liquid which does not include the abrasive grains and the cutting chips. In this case, the reservoir has a suitable shut-off valve for permitting the medium liquid to be discharged from the reservoir. The shut-off valve is controlled by the control device 112 such that the medium liquid is allowed to be discharged from the reservoir into the first reservoir 16 when the amount of the medium liquid which is stored in the filtrate reservoir 82 is insufficient.

In the illustrated embodiments, the second filter device 14, 134 employ the cross flow filtration system using the ceramic filter. However, the ceramic filter may be replaced by a cartridge type filter. Further, other filtering methods such as diatomaceous earth filtration or electrostatic filtration are employed. In the filtration methods other than the cross flow filtration, a cake layer tends to be formed on the surface of the filter element, and this cake layer prevents the cutting chips from passing through the filter element, undesirably deteriorating the filtering efficiency. In this respect, the cross flow filtration is most preferably employed.

The reclaiming apparatus 10, 130 may process various kinds of the used working fluid. That is, if the filtration films 18 of the first filter 24 in the first filter device 12, 132 are capable of separating the cutting chips and the abrasive grains from each other depending on the size of the abrasive grains, the reclaiming apparatus 10, 132 can process the used working fluid in which the abrasive grains having various sizes are contained. In the illustrated embodiments, the working fluid includes GC abrasive grains. However, the working fluid may include various kinds of the abrasive grains such as WA, for instance, which are suitable for the abrasive machining.

The shut-off valves 30, 42, 62, 72, 86 in the embodiment of FIGS. 2–4, and the shut-off valves 39, 152, 140 in the embodiment of FIGS. 6–9 are operated by the control device 112 to be opened or closed. Further, the circulating pump 26 is turned on and off under the control of the control device 112. However, these valves and the circulating pump 26 may be manually operated so as to eliminate the control device 112. Alternatively, all of the valves provided in the reclaiming apparatus 10, 130 may be controlled by the control device 112.

In the embodiment of FIGS. 2–4, for example, when the used working fluid is processed according to the change pattern "a" as described by reference to FIGS. 4(a) and 4(b), the shut-off valve 30 may be manually closed and the shut-off valve 42 may be manually opened when the the amount of the used working fluid in the first reservoir 16 becomes equal to the amount of the fluid initially stored in the first reservoir 16. In this case, the amount of the fluid in the reservoir 16 is visually inspected. However, when the used working fluid is processed according to the change pattern "b" or "c" as described by reference to FIGS. 4(a) and 4(b), it is preferable that at least the shut-off valve 86 in the feeding passage 88 be a solenoid-operated valve controlled by the control device 112 for automatically operating the reclaiming apparatus 10.

When the shut-off valves such as the valve 39 and the circulating pump 26 are manually operated in the embodiment of FIGS. 6–9, it is not necessarily required to detect the count-up signals generated by the integrating flowmeters 138, 150 if an operator visually checks the generation of the count-up signals.

The solenoid-operated valves such as the valve 30 used in the embodiment of FIGS. 2–4 may be replaced by motor-operated valves on the other hand, the motor-operated valves such as the valve 39 used in the embodiment of FIGS. 6–9 may be replaced by solenoid-operated valves. If the solenoid-operated valves are used in the embodiment of FIGS. 6–9, these valves are opened or closed at a relatively high speed, and therefore it is not required to open the shut-off valve 152 only after the shut-off valve 39 has been closed. Thus, it is possible to open the shut-off valve 152 at the same time when the shut-off valve 39 is closed.

In the second filter device 14, 134, another reservoir similar to the second reservoir 46 may be provided in parallel with the second reservoir 46. This additional reservoir is connected to the waste fluid passage 40, second supply passage 64, second return passage 70 and discharge line 74, via appropriate shut-off valves such as the shut-off valve 39. In this arrangement, the waste fluid passage 40 is selectively connected to the second reservoir 46 and the additional reservoir by opening and closing the appropriate shut-off valves. For instance, when the waste fluid passage 40 is connected to the second reservoir 46, the waste fluid fed through the passage 40 does not flow into the additional reservoir. In this case, the concentrated waste fluid is stored in the additional reservoir, and is consequently discarded from the discharge line 74.

Described more specifically, when the concentrated waste fluid is discarded outside the second filter device 14, 134, it is desirable that the waste fluid be not circulating in the second circulating path. If the additional reservoir is provided in addition to the second reservoir 46, the waste fluid passage 40 is selectively connected to the second reservoir 46 and the additional reservoir. Thus, the waste fluid is kept flowing in the second circulating path via one of the two reservoirs which is connected to the waste fluid passage 40, even when the waste fluid is continuously fed from the first filter device 12, 132. At the same time, the concentrated waste fluid is discarded from the discharge line 74 via the other reservoir which is not connected to the waste fluid passage 40.

In the illustrated embodiments, a batch of the used working fluid is processed separately from the abrasive machining apparatus. However, the reclaiming apparatus 10, 130 may be built in an abrasive machining apparatus such as a lapping device. In this case, the reclaimed working fluid recovered from the recovery passage 44 is stored in an appropriate reservoir and is applied to the abrasive machining apparatus, while the used working fluid discharged from the abrasive machining apparatus is stored in the first reservoir 16.

In the embodiment of FIGS. 6–9, the backwash fluid reservoir 146 is disposed such that the level of the medium liquid in the reservoir 146 is higher than the upper end of the first filter 24 so as to provide the water head difference H2, so that the medium liquid in the reservoir 146 is supplied to the first filter 24 for backwashing the filtration films 18 by utilizing the water head difference H2. However, the reservoir 146 may be disposed at a position lower than the first filter 24, provided that the backwash passage 154 has a pump for supplying the medium liquid in the reservoir 146 to the first filter 24. In another form, the backwash reservoir 146 may be eliminated if the backwash passage 154 is directly connected to the shut-off valve 144, and the medium liquid is supplied to the second chambers 22 by the feeding pump 84. In this case, the filtrate reservoir 82 serves as a medium liquid reservoir.

In the embodiment of FIGS. 6–9, the second filter 54 is disposed at a relatively low position in the second filter device 134, and the filtrate (medium liquid) is supplied to the reservoir 146 by the feeding pump 84. However, if the second filter 54 is disposed at the same level as the reservoir 146, the filtrate passage 80 may be connected directly to the reservoir 146.

In the embodiment of FIGS. 6–9, the reclaiming treatment of the used working fluid is terminated after the predetermined time has elapsed. However, the reclaiming treatment may be terminated depending on the cutting chip concentration of the used working fluid which is detected by measuring the viscosity or specific gravity of the fluid in the first reservoir 16.

It is to be understood that the present invention may be embodied with various changes without departing from the scope of the invention defined in the following claims.

We claim:

1. A method of reclaiming a used working fluid produced after a working fluid which contains abrasive grains dispersed therein is used for abrasive machining on a workpiece, wherein cutting chips produced during said abrasive machining are removed from said used working fluid, said method comprising the steps of:

circulating said used working fluid in a circulating path including a cross flow filter having a first chamber and a second chamber which are defined by a cross flow filtration film, said cross flow filtration film having pores which are sufficiently smaller than an average grain size of said abrasive grains and are sufficiently larger than an average grain size of said cutting chips;

cross flow filtering said used working fluid while said used working fluid is fed to flow over the surface of said cross flow filtration film, such that a portion of said used working fluid is discharged through said cross flow filtration film, as a waste fluid, into said second chamber of said cross flow filter together with said cutting chips, for reducing an amount of said cutting chips in said used working fluid flowing in said circulating path; and recovering a reclaimed working fluid from said circulating path, said reclaimed working fluid containing said cutting chips in an amount which has been reduced in said step of cross flow filtering said used working fluid.

2. A method of reclaiming a used working fluid according to claim 1, wherein said method further comprising a step of adding a medium liquid which does not contain said abrasive grains and said cutting chips, to said used working fluid before or while said used working fluid is flowing in said circulating path, said medium liquid being added by an amount equal to an amount of said waste fluid which has been discharged into said second chamber in said step of cross flow filtering said used working fluid.

3. A method of reclaiming a used working fluid according to claim 2, further comprising a step of recovering said medium liquid by filtering said waste fluid which has been discharged into said second chamber of said cross flow filter together with said cutting chips, through another filtration film having pores which are sufficiently smaller than said average grain size of said cutting chips, the recovered medium liquid being utilized in said step of adding said medium liquid.

4. A method of reclaiming a used working fluid according to claim 1, wherein said cross flow filtration film of said cross flow filter is formed of a single mesh layer.

5. A method of reclaiming a used working fluid according to claim 1, further comprising a step of recovering said medium liquid which does not contain said abrasive grains and said cutting chips, by filtering said waste fluid which has been discharged into said second chamber of said cross flow filter together with said cutting chips, through another filtration film having pores which are sufficiently smaller than said average grain size of said cutting chips.

6. A method of reclaiming a used working fluid produced after a working fluid which contains abrasive grains dispersed therein is used for abrasive machining on a workpiece, wherein cutting chips produced during said abrasive machining are removed from said used working fluid, said method comprising the steps of:

circulating said used working fluid in a circulating path including a cross flow filter having a first chamber and a second chamber which are defined by a cross flow filtration film, said cross flow filtration film having pores which are sufficiently smaller than an average grain size of said abrasive grains and are sufficiently larger than an average grain size of said cutting chips;

cross flow filtering said used working fluid while said used working fluid is fed to flow over the surface of said cross flow filtration film, such that a portion of said used working fluid is discharged through said cross flow filtration film, as a waste fluid, into said second chamber of said cross flow filter together with said cutting chips, for reducing an amount of said cutting chips in said used working fluid flowing in said circulating path;

supplying a medium liquid which does not contain said abrasive grains and said cutting chips, to said circulating path, such that at least a portion of said medium liquid is fed to said first chamber via said second chamber of said cross flow filter, said medium liquid being supplied to said circulating path by an amount equal to an amount of said waste fluid which has been discharged into said second chamber in said step of cross flow filtering said used working fluid; and recovering a reclaimed working fluid from said circulating path, said reclaimed working fluid including said medium liquid in an amount equal to that of said medium liquid initially included in said used working fluid.

7. A method of reclaiming a used working fluid according to claim 6, wherein said cross flow filtration film of said cross flow filter is formed of a single mesh layer.

8. A method of reclaiming a used working fluid according to claim 6, further comprising a step of recovering said medium liquid which does not contain said abrasive grains and said cutting chips, by filtering said waste fluid which has been discharged into said second chamber of said cross flow filter together with said cutting chips, through another filtration film having pores which are sufficiently smaller than said average grain size of said cutting chips.

9. A method of reclaiming a used working fluid according to claim 6, further comprising a step of recovering said medium liquid by filtering said waste fluid which has been discharged into said second chamber of said cross flow filter together with said cutting chips, through another filtration film having pores which are sufficiently smaller than said average grain size of said cutting chips, the recovered medium liquid being utilized in said step of supplying said medium liquid.

10. A method of reclaiming a used working fluid according to claim 6, wherein said step of supplying said medium liquid is adapted to stop a circulating flow of said used working fluid in said circulating path after said second chamber of said cross flow filter is filled with said medium liquid.

11. An apparatus for reclaiming a used working fluid produced after a working fluid which contains abrasive grains dispersed therein is used for abrasive machining on a workpiece, wherein cutting chips produced during said abrasive machining are removed from said used working fluid, said apparatus comprising:

a first reservoir for storing said used working fluid;

a cross flow filter having a first chamber and a second chamber which are defined by a cross flow filtration film, said cross flow filtering film having pores which are sufficiently smaller than an average grain size of said abrasive grains and are sufficiently larger than an average grain size of said cutting chips;

a circulating path which is partially defined by said first reservoir and said cross flow filter;

a circulating device for circulating said used working fluid in said circulating path, while said used working fluid is fed to flow over the surface of said cross flow filtration film, so that a portion of said used working fluid is cross-flow filtered through said cross flow filtration film, and discharged with said cutting chips as a waste fluid, into said second chamber of said cross flow filter; and a recovering device for recovering a reclaimed working fluid from said circulating path.

12. An apparatus for reclaiming a used working fluid according to claim 11, further comprising a medium liquid supply device including: a medium liquid reservoir for storing said medium liquid which does not contain said abrasive grains and said cutting chips; a medium liquid supply passage which connects said medium liquid reservoir to said second chamber of said cross flow filter; and a fluid flow measuring device for measuring an amount of said waste fluid which has been discharged from said circulating path into said second chamber by said circulating device, and an amount of said medium liquid which has been supplied from said medium liquid reservoir to said circulating path, said medium liquid supply device supplying said medium liquid in said reservoir to said circulating path, such that at least a portion of said medium liquid is fed to said first chamber via said second chamber of said cross flow filter, said medium liquid being supplied to said circulating path by an amount equal to said amount of said waste fluid which has been discharged into said second chamber.

13. An apparatus for reclaiming a used working fluid according to claim 12, wherein said cross flow filter is disposed such that the lower end of said second chamber is positioned above the lower end of said first chamber and the level of said used working fluid stored in said first reservoir.

14. An apparatus for reclaiming a used working fluid according to claim 13, wherein said cross flow filter is disposed such that the upper end of said cross flow filter is positioned below the fluid level of said medium liquid stored in said medium liquid reservoir.

15. An apparatus for reclaiming a used working fluid according to claim 12, further comprising a medium liquid recovering device for recovering said medium liquid which does not contain said abrasive grains and said cutting chips, by filtering said waste fluid which has been discharged into said second chamber of said cross flow filter, through another filtration film having pores which are sufficiently smaller than said average grain size of said cutting chips, said recovered medium liquid being supplied to said medium liquid reservoir.

16. An apparatus for reclaiming a used working fluid according to claim 11, wherein said filtration film of said cross flow filter is formed of a single mesh layer.

17. An apparatus for reclaiming a used working fluid according to claim 11, further comprising a medium liquid recovering device for recovering said medium liquid which does not contain said abrasive grains and said cutting chips, by filtering said waste fluid which has been discharged into said second chamber of said cross flow filter, through another filtration film having pores which are sufficiently smaller than said average grain size of said cutting chips.

18. An apparatus for reclaiming a used working fluid according to claim 17, said medium liquid recovering device further comprising:

a second reservoir for storing said waste fluid which has been discharged into said second chamber of said cross flow filter;

a filtering device having a first chamber and a second chamber which are defined by said filtration film;

a second circulating path partially defined by said second reservoir and said first chamber of said filtering device;

a circulating device for circulating said waste fluid in said second circulating path with said waste fluid being fed to flow over the surface of said filtration film, while said waste fluid is cross-flow filtered through said filtration film so that said medium liquid which does not contain said cutting chips is fed into said second chamber of said filtering device;

a discharging device for discharging a concentrated waste fluid having a cutting chip concentration which has in said second circulating path.

19. An apparatus for reclaiming a used working fluid according to claim 11, further comprising:

a medium liquid reservoir for storing said medium liquid transmitted into said second chamber;

a medium liquid supply passage having a fluid flow control valve and a feeding device, said passage connecting said medium liquid reservoir to said first reservoir;

means for detecting a concentration of said abrasive grains in said used working fluid flowing in said circulating path; and a control device for controlling said concentration of said abrasive grains to be held within a predetermined range by opening and closing said fluid flow control valve, based on the detected concentration of said abrasive grains.

* * * * *